US012126558B2

(12) United States Patent
Si et al.

(10) Patent No.: US 12,126,558 B2
(45) Date of Patent: Oct. 22, 2024

(54) METHOD FOR DETERMINING MAPPING OF ANTENNA PORTS, AND TERMINAL

(71) Applicant: VIVO MOBILE COMMUNICATION CO., LTD., Guangdong (CN)

(72) Inventors: Ye Si, Guangdong (CN); Xiaodong Sun, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 319 days.

(21) Appl. No.: 17/671,282

(22) Filed: Feb. 14, 2022

(65) Prior Publication Data

US 2022/0166583 A1 May 26, 2022

Related U.S. Application Data

(63) Continuation of application No. PCT/CN2020/103507, filed on Jul. 22, 2020.

(30) Foreign Application Priority Data

Aug. 15, 2019 (CN) .......................... 201910755726.9

(51) Int. Cl.
*H04L 5/00* (2006.01)
(52) U.S. Cl.
CPC .......... *H04L 5/0051* (2013.01); *H04L 5/0026* (2013.01)
(58) Field of Classification Search
None
See application file for complete search history.

(56) References Cited

U.S. PATENT DOCUMENTS

| 9,173,208 | B2 | 10/2015 | Ouchi et al. |
| 10,154,497 | B2* | 12/2018 | Noh ...................... H04L 5/0053 |
| 11,343,046 | B2 | 5/2022 | Wang et al. |
| 11,395,275 | B2* | 7/2022 | Marinier ................ H04B 7/024 |
| 2012/0106489 | A1 | 5/2012 | Konishi et al. |
| 2013/0077574 | A1* | 3/2013 | Ekpenyong ........... H04L 5/0094 370/329 |
| 2014/0016576 | A1 | 1/2014 | Noh |
| 2014/0295909 | A1* | 10/2014 | Ouchi ................. H04W 52/245 455/522 |
| 2015/0092699 | A1* | 4/2015 | Chen ..................... H04W 52/04 370/329 |

(Continued)

FOREIGN PATENT DOCUMENTS

| CN | 101540631 A | 9/2009 |
| CN | 102075274 A | 5/2011 |

(Continued)

OTHER PUBLICATIONS

Office Action for Chinese Patent Application No. 201910755726.9 issued by the Chinese Patent Office.

(Continued)

*Primary Examiner* — Phirin Sam

(74) *Attorney, Agent, or Firm* — IP & T GROUP LLP

(57) ABSTRACT

A method for determining mapping of antenna ports includes: determining mapping of antenna ports of an SRS according to the number of the antenna ports of the SRS, (Continued)

wherein the SRS is an SRS with a comb size of N, N is an even number greater than 4, and the number of the antenna ports is 1, 2 or 4.

20 Claims, 2 Drawing Sheets

(56) References Cited

U.S. PATENT DOCUMENTS

| | | | |
|---|---|---|---|
| 2015/0131566 A1* | 5/2015 | Seo | H04B 1/3838 370/329 |
| 2015/0304994 A1* | 10/2015 | Kim | H04L 27/2601 370/280 |
| 2017/0201967 A1* | 7/2017 | Yang | H04L 5/14 |
| 2017/0238309 A1* | 8/2017 | Han | H04L 5/0055 370/335 |
| 2017/0353931 A1* | 12/2017 | Stern-Berkowitz | H04L 5/0048 |
| 2019/0174466 A1 | 6/2019 | Zhang et al. | |
| 2019/0215110 A1 | 7/2019 | Yang et al. | |
| 2019/0268185 A1* | 8/2019 | Wang | H04L 27/2613 |
| 2019/0281588 A1* | 9/2019 | Zhang | H04B 7/0617 |
| 2019/0342907 A1* | 11/2019 | Huang | H04W 72/23 |
| 2019/0372732 A1* | 12/2019 | Faxér | H04B 7/0691 |
| 2020/0220676 A1 | 7/2020 | Xu et al. | |
| 2021/0105753 A1* | 4/2021 | Zhang | H04L 5/0048 |
| 2021/0359819 A1* | 11/2021 | Xiao | H04W 80/02 |
| 2023/0059545 A1* | 2/2023 | Stern-Berkowitz | H04L 5/0048 |
| 2023/0121186 A1* | 4/2023 | Choi | H04L 1/06 370/330 |
| 2023/0362947 A1* | 11/2023 | Zhang | H04W 52/08 |
| 2023/0403188 A1* | 12/2023 | Ogawa | H04J 13/004 |
| 2024/0072855 A1* | 2/2024 | Papasakellariou | H04W 72/0453 |

FOREIGN PATENT DOCUMENTS

| | | |
|---|---|---|
| CN | 103250365 A | 8/2013 |
| CN | 106455094 A | 2/2017 |
| CN | 107294686 A | 10/2017 |
| CN | 108260219 A | 7/2018 |
| CN | 109391395 A | 2/2019 |
| EP | 2426831 A1 | 3/2012 |
| WO | 2018/126474 A1 | 7/2018 |

OTHER PUBLICATIONS

3rd Generation Partnership Project; Technical Specification Group Radio Access Network; NR; Physical channels and modulation (Release 15), 3GPP TS 38.211, Jun. 2019, V15.6.0.

3rd Generation Partnership Project; Technical Specification Group Radio Access Network; NR; Physical channels and modulation (Release 16), 3GPP TS 38.211, Mar. 2020, V16.1.0.

Remaining Issues on UL Positioning Reference Signal, 3GPP TSG RAN WG1 #100bis, R1-2001732, Apr. 20-30, 2020, e-Meeting. Source: OPPO.

Discussion on DL RS for NR positioning, 3GPP TSG RAN WG1 #97, R1-1906177, May 13-17, 2019, Reno, USA. Source:vivo.

Discussion on UL RS for NR positioning, 3GPP TSG RAN WG1 #97, R1-1906178, May 13-17, 2019, Reno, USA. Source: vivo.

UL Reference Signals for NR Positioning, 3GPP TSG RAN WG1 Meeting #97, R1-1907509, May 13-17, 2019, Reno, NV, USA. Source: Ericsson.

International Search Report and Written Opinion of International Application No. PCT/CN2020/103507 issued by the Chinese Patent Office on Oct. 15, 2020.

The First Office Action of Priority Application No. CN 201910755726.9 issued by the Chinese Patent Office on Mar. 23, 2021.

* cited by examiner

METHOD FOR DETERMINING MAPPING OF ANTENNA PORTS, AND TERMINAL

CROSS-REFERENCE TO RELATED APPLICATIONS

This application is a Bypass Continuation application of PCT/CN2020/103507 filed on Jul. 22, 2020, which claims priority to Chinese Patent Application No. 201910755726.9 filed on Aug. 15, 2019, which are incorporated herein by reference in their entirety.

TECHNICAL FIELD

The present disclosure relates to the technical field of communication, and in particular, to a method for determining mapping of antenna ports, and a terminal.

BACKGROUND

In a communication system, a sounding reference signal (SRS) may be applied to beam management, codebook-based transmission, non-codebook-based transmission, antenna switching transmission or positioning. However, the communication system in related art only can support SRS transmission with a comb size of 2 (comb-2) and a comb size of 4 (comb-4), resulting in poor coverage effect and low audibility of the SRS.

SUMMARY

According to a first aspect, embodiments of the present disclosure provide a method for determining mapping of antenna ports. The method is applied to a terminal and includes:
  determining mapping of antenna ports of an SRS according to the number of the antenna ports of the SRS, wherein the SRS is an SRS with a comb size of N, N is an even number greater than 4, and the number of the antenna ports is 1, 2 or 4.

According to a second aspect, embodiments of the present disclosure provide a terminal, including:
  a determination module, configured to determine mapping of antenna ports of an SRS according to the number of the antenna ports of the SRS, wherein the SRS is an SRS with a comb size of N, N is an even number greater than 4, and the number of the antenna ports is 1, 2 or 4.

According to a third aspect, an embodiment of the present disclosure provides a terminal, including a memory, a processor, and a program stored in the memory and executable on the processor, wherein when the program is executed by the processor, the steps of the method for determining mapping of the antenna ports provided in the embodiments of the present disclosure are implemented.

According to a fourth aspect, embodiments of the present disclosure provide a non-transitory computer-readable storage medium, wherein the non-transitory computer-readable storage medium stores a computer program, and when the computer program is executed by a processor, steps of the method for determining mapping of the antenna ports provided in the embodiment of the present disclosure are implemented.

DESCRIPTION OF EMBODIMENTS

The technical solutions in the embodiments of the present disclosure are described below clearly with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure shall fall within the protection scope of the present disclosure.

The term "include" and any other variants in this specification and claims of the present application are intended to cover a non-exclusive inclusion, for example, a process, method, system, product, or device that includes a list of steps or units is not necessarily limited to those expressly listed steps or units, but may include other steps or units not expressly listed or inherent to such a process, method, product, or device. In addition, "and/or" used in this specification and claims means at least one of the connected objects. For example, A and/or B represents the following three cases: Only A exists, only B exists, and both A and B exist.

In the embodiments of the present disclosure, the word such as "exemplary" or "example" is used to represent giving an example, an illustration, or a description. Any embodiment or design scheme described as an "exemplary" or "example" in the embodiments of the present disclosure should not be explained as being more preferred or having more advantages than another embodiment or design scheme. Exactly, use of the term "exemplary" or "for example" is intended to present a related concept in a specific manner.

The embodiments of the present disclosure are described below with reference to the accompanying drawings. A method for determining mapping of antenna ports and a terminal provided in the embodiments of the present disclosure may be applied to a wireless communication system. The wireless communication system may be a new radio (NR) system, or an evolved long term evolution (eLTE) system, or a long term evolution (LTE) system, or a subsequent evolution communication system.

Figure 1:
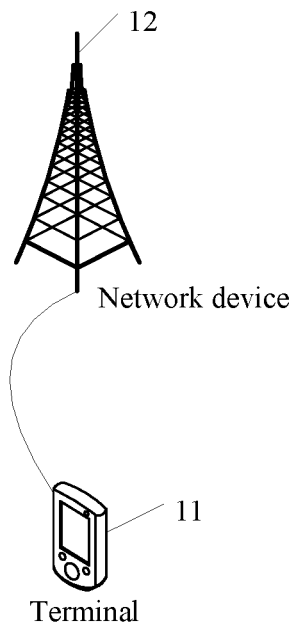
FIG. 1 is a structural diagram of a network system applicable to an embodiment of the present disclosure.

Referring to FIG. 1, FIG. 1 is a structural diagram of a network system applicable to an embodiment of the present disclosure. As shown in FIG. 1, the network system includes a terminal 11 and a network device 12, wherein the terminal 11 may be user equipment (UE) or other terminal side devices, for example: a mobile phone, a tablet personal computer, a laptop computer, a personal digital assistant (PDA), a mobile Internet device (MID), a wearable device or a robot. It should be noted that a specific type of the terminal 11 is not limited in the embodiments of the present disclosure. The network device 12 may be a 4-th generation (4G) base station, or a 5-th generation (5G) base station, or a base station of a later version, or a base station in other communication systems, or called a node B, an evolved node B, or a transmission reception point (TRP), or an access point (AP), or other words in the field. As long as the same technical effect is achieved, the network device is not limited to specific technical words. In addition, the network device 12 may be a master node (MN) or a secondary node (SN). It should be noted that in embodiments of the present disclosure, only the 5G base station is used as an example, but a specific type of the network device is not limited.

Figure 2:
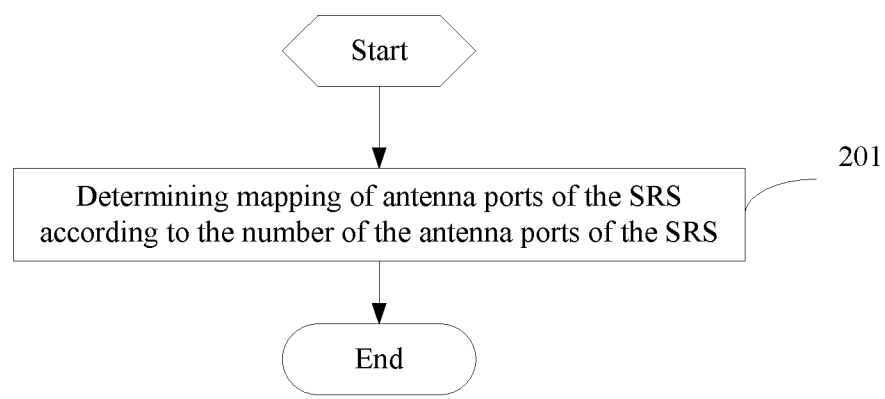
FIG. 2 is a flowchart of a method for determining mapping of antenna ports according to an embodiment of the present disclosure.

Referring to FIG. 2, FIG. 2 is a flowchart of a method for determining mapping of antenna ports according to an embodiment of the present disclosure. The method is applied to a terminal, and as shown in FIG. 2, includes the following steps:

Step 201: determining mapping (parameters) of antenna ports of an SRS according to the number of the antenna ports of the SRS, wherein the SRS is an SRS with a comb size of N, N is an even number greater than 4, and the number of the antenna ports is 1, 2 or 4.

The SRS with the comb size of N may be an SRS with a comb size which is 6, 8, 12 or other even number greater than 4. The number of the antenna ports may correspond to the comb size, for example, when the comb size is 6, 8 or 12, the number of the antenna ports may be 1, 2 or 4.

The step of determining mapping of the antenna ports of the SRS according to the number of the antenna ports of the SRS may be: determining mapping of the antenna ports of the SRS according to a relationship between a mapping set of the antenna ports and a set of the number of the antenna ports, and may be: determining mapping of each antenna port of the SRS and transmitting the SRS through the antenna ports of the SRS.

It should be noted that, in the embodiments of the present disclosure, the mapping of the antenna port may also be understood as the mapping parameter (or called mapping information) of the antenna port, for example: parameters (or information) related to the mapping of the antenna port, such as a position where the antenna port of the SRS is mapped and the cyclic shift of the sequence to which the antenna port of the SRS is mapped.

In the embodiments of the present disclosure, the mapping of the antenna port of the SRS with the comb size greater than 4 may be realized through the above step, so that SRS transmission with the comb size greater than 4 is supported, the SRS is more sparse, and the coverage effect of the SRS is more excellent; and due to the more sparse SRS, the SRS is monitored more easily, so that the audibility of the SRS is improved.

As an optional implementation manner, the mapping (parameter) of the antenna port of the SRS includes at least one of:
a cyclic shift of a sequence to which the antenna ports of the SRS are mapped; or
a comb position where the antenna ports of the SRS are mapped.

The comb position may be a resource element (RE) position, for example: on an orthogonal frequency division multiplexing (OFDM) symbol, a starting position of an RE in a first resource block (RB) where the SRS is located or a certain RB. The RE starting position is a natural number less than the comb size, such as comb-6, the RE starting position is 0, 1, 2 . . . 5; comb-8, the RE starting position is 0, 1, 2, 3 . . . 7; comb-12, the RE starting position is 0, 1, 2, 3 . . . 11. In addition, mapping to different comb positions may refer to mapping to a certain OFDM symbol, mapping to different RE starting positions in one RB, on a certain OFDM symbol, mapping to different comb positions, that is, mapping to the RE of frequency division multiplexing (FDM).

The cyclic shift of the sequence to which the antenna ports of the SRS are mapped may be the cyclic shift of the sequence of each antenna port of the SRS; moreover, the cyclic shifts of the sequences to which different antenna ports are mapped may be different, or the cyclic shifts of the sequences to which part of the antenna ports are mapped may be the same, which will not be limited.

In addition, the comb position where the antenna ports of the SRS are mapped may be the comb position of each antenna port of the SRS; moreover, the comb positions where different antenna ports are mapped may be different, or the comb positions where part of the antenna ports are mapped may be the same, which will not be limited.

In this implementation manner, the cyclic shift of the sequence and the comb position to which the antenna ports of the SRS are mapped may be determined, so that the mapping of the SRS is more accurate, and mapping error is avoided.

Optionally, the cyclic shift of the sequence is determined according to at least one of a cyclic shift offset value, a maximum cyclic shift number or an antenna port index,
wherein determination according to at least one of the cyclic shift offset value, the maximum cyclic shift number or the antenna port index may be: determining the cyclic shift of the sequence of each antenna port is determined according to a formula including at least one of the cyclic shift offset value, the maximum cyclic shift number or the antenna port index. Of course, this is not limited. For example: it may be: pre-configuring a mapping relationship between at least one of the cyclic shift offset value, the maximum cyclic shift number or the antenna port index and the cyclic shift so as to determine the cyclic shift of the sequence of each antenna port through the mapping relationship.

In this implementation manner, the cyclic shift of the sequence of each antenna port may be accurately determined according to at least one of the cyclic shift offset value, the maximum cyclic shift number or the antenna port index.

Optionally, the comb position is determined according to at least one of whether frequency division multiplexing (FDM) is performed, a comb offset value, a maximum cyclic shift number, an antenna port index or a comb size of the SRS,
wherein determination according to at least one of whether FDM is performed, the comb offset value, the maximum cyclic shift number, the antenna port index and the comb size of the SRS may be: determining the comb position where each antenna port is mapped according to at least one of the maximum cyclic shift number, the antenna port index or the comb size of the SRS, or may also be: combining with whether each antenna port is FDM. Of course, this is not limited. For example: it may be: pre-configuring a mapping relationship between at least one of whether FDM is performed, the comb offset value, the maximum cyclic shift number, the antenna port index or the comb size of the SRS and the comb position so as to determine the comb position where each antenna port is mapped through the mapping relationship.

In this implementation manner, the cyclic shift of the sequence of each antenna port may be accurately determined according to at least one of whether FDM is performed, the comb offset value, the maximum cyclic shift number, the antenna port index or the comb size of the SRS.

It should be noted that at least one of whether FDM is performed, the comb offset value, the maximum cyclic shift number, the antenna port index and the comb size of the SRS may be agreed by a protocol or indicated by a network, for example: at least one of whether FDM is performed, the comb offset value, the maximum cyclic shift number, the antenna port index or the comb size of the SRS configured by a network side through an RRC signaling.

Determination of the cyclic shift and the comb position will be described in detail below according to a plurality of implementation manners.

In one implementation manner, in a case that the number of the antenna ports is 4 and an FDM mode is unrelated to the cyclic shift offset value, the four antenna ports of the SRS are divided into two groups, the antenna ports in the same group are mapped to the same comb position, the antenna ports in the same group are mapped to different sequences of the cyclic shift, and the antenna ports in different groups are mapped to different comb positions, wherein the case that the FDM mode is unrelated to the cyclic shift offset value may be cyclic shift offset value and the FDM mode are unrelated, and both are independent. For example: the mapping of the four antenna ports is related to the cyclic shift of the sequence and is related to FDM, but the FDM mode is unrelated to the cyclic shift offset value ($n_{SRS}^{cs}$), that is, the four antenna ports may be distinguished through the cyclic shift of the sequence and may also be distinguished by FDM, and when the four antenna ports are distinguished by FDM, the influence of $n_{SRS}^{cs}$ is not considered.

In the above implementation manner, in addition, dividing the four antenna ports into two groups may be two antenna ports in each group.

The four antenna ports of the SRS are divided into two groups, the antenna ports in the same group are mapped to the same comb position, the antenna ports in the same group are mapped to different sequences of the cyclic shift, and the antenna ports in different groups are mapped to different comb positions, so that the antenna ports in one antenna port group may be mapped to the same comb position and are distinguished through different cyclic shifts, and groups are distinguished by different comb positions, thereby saving the comb position.

For example: in a case that the four antenna ports of the SRS are divided into two groups, $$n_{SRS}^{cs,i} = \left[ n_{SRS}^{cs} + \frac{n_{SRS}^{cs,max} \cdot [(p_i - 1000) \bmod 2] \cdot 2}{N_{ap}^{SRS}} \right] \bmod n_{SRS}^{cs,max},$$

$$k_{TC}^{(p_i)} = \begin{cases} (\bar{k}_{TC} + K_{TC}/2) \bmod K_{TC} & \text{if } p_i \in \{1000, 1001\}(\text{or } p_i \in \{1002, 1003\}) \\ \bar{k}_{TC} & \text{otherwise} \end{cases};$$

or $$n_{SRS}^{cs,i} = \left[ n_{SRS}^{cs} + \frac{n_{SRS}^{cs,max} \cdot \lfloor (p_i - 1000)/2 \rfloor \cdot 2}{N_{ap}^{SRS}} \right] \bmod n_{SRS}^{cs,max},$$

$$k_{TC}^{(p_i)} = \begin{cases} (\bar{k}_{TC} + K_{TC}/2) \bmod K_{TC} & \text{if } p_i \in \{1001, 1003\}(\text{or } p_i \in \{1000, 1002\}) \\ \bar{k}_{TC} & \text{otherwise} \end{cases};$$

where $n_{SRS}^{cs,i}$ is the cyclic shift of the sequence to which the antenna port i is mapped, $n_{SRS}^{cs}$ represents the cyclic shift offset value, $N_{ap}^{SRS}$ represents the number of the antenna ports, $n_{SRS}^{cs,max}$ represents the maximum cyclic shift number, $p_i$ represents the index of the antenna port i, $k_{TC}^{(p_i)}$ is the comb position where the antenna port i is mapped, $\bar{k}_{TC}$ represents the comb offset value, and $K_{TC}$ is the comb size of the SRS.

In the above formula, if $p_i \in \{1000, 1001\}$ or $p_i \in \{1002, 1003\}$) may also be expressed as follows:

$$k_{TC}^{(p_i)} = \begin{cases} (\bar{k}_{TC} + K_{TC}/2) \bmod K_{TC} & \text{if } p_i \in \{1000, 1001\} \\ \bar{k}_{TC} & \text{otherwise} \end{cases};$$

or $$k_{TC}^{(p_i)} = \begin{cases} (\bar{k}_{TC} + K_{TC}/2) \bmod K_{TC} & \text{if } p_i \in \{1002, 1003\} \\ \bar{k}_{TC} & \text{otherwise} \end{cases};$$

similarly, other similar expression may also be expressed in this way and will not be elaborated.

By the above formula, in a case that the number of the antenna ports is 4 and the comb size is an even number greater than 4, the cyclic shifts of the sequence may be distributed to the four antenna ports uniformly, so that the transmission performance of the SRS is improved.

It should be noted that, in the embodiments of the present disclosure, the calculation formula is illustrated on the basis that the antenna port sequence is 1000+i, and i is an integer greater than or equal to 0. However, in the embodiments of the present disclosure, it is not limited that the antenna port sequence is 1000+i, or may be i+other values or not added. In these cases, the formula provided by the embodiments of the present disclosure may be adopted, except that it is necessary to replace the value of the antenna port sequence, that is, a value obtained by replacing 1000 or 1000+i in the formula.

In one implementation manner, in a case that the number of the antenna ports is 4 and an FDM mode is unrelated to the cyclic shift offset value, the four antenna ports of the SRS are distinguished by at least one of the cyclic shift of the sequence or the FDM, wherein that the four antenna ports of the SRS are distinguished by at least one of the cyclic shift of the sequence or the FDM may be that the four antenna ports may be distinguished through the cyclic shift of the sequence or through FDM. For example, the cyclic shifts of the sequences to which different antenna ports are mapped are different, or the comb positions where different antenna ports (or antenna port groups) are mapped are different, or the comb positions where different antenna ports (or antenna port groups) are mapped are different when the cyclic shifts of the sequences to which different antenna ports are mapped are different.

In this implementation manner, the four antenna ports are distinguished by at least one of the cyclic shift of the sequence or the FDM, so that the mapping flexibility of the antenna ports can be improved.

For example: in a case that the four antenna ports of the SRS are distinguished by at least one of the cyclic shift of the sequence or the FDM, the cyclic shift of the sequence is calculated by the following formula $$n_{SRS}^{cs,i} = \left[ n_{SRS}^{cs} + \left\lfloor \frac{n_{SRS}^{cs,max} \cdot (p_i - 1000)}{N_{ap}^{SRS}} \right\rfloor \right] \bmod n_{SRS}^{cs,max};$$

or $$n_{SRS}^{cs,i} = \left[n_{SRS}^{cs} + \left\lceil \frac{n_{SRS}^{cs,max} \cdot (p_i - 1000)}{N_{ap}^{SRS}} \right\rceil \right] \bmod n_{SRS}^{cs,max};$$

the comb position is calculated by the following formula:

$$k_{TC}^{(p_i)} = \begin{cases} (\bar{k}_{TC} + K_{TC}/2) \bmod K_{TC} & \text{if } p_i \in \{1001, 1003\} \text{(or } p_i \in \{1000, 1002\}) \\ \bar{k}_{TC} & \text{otherwise} \end{cases};$$

or $$k_{TC}^{(p_i)} = (\bar{k}_{TC} + (p_i - 1000) * K_{TC}/N_{ap}^{SRS}) \bmod K_{TC};$$

or $$k_{TC}^{(p_i)} = (\bar{k}_{TC} + \lfloor (p_i - 1000) * K_{TC}/N_{ap}^{SRS} \rfloor) \bmod K_{TC};$$

or $$k_{TC}^{(p_i)} = (\bar{k}_{TC} + \lceil (p_i - 1000) * K_{TC}/N_{ap}^{SRS} \rceil) \bmod K_{TC};$$

where $n_{SRS}^{cs,i}$ is the cyclic shift of the sequence to which the antenna port i is mapped, $n_{SRS}^{cs}$ represents the cyclic shift offset value, $N_{ap}^{SRS}$ represents the number of the antenna ports, $n_{SRS}^{cs,max}$ represents the maximum cyclic shift number, $p_i$ represents the index of the antenna port i, $k_{TC}^{(p_i)}$ is the comb position where the antenna port i is mapped, $\bar{k}_{TC}$ represents the comb offset value, and $K_{TC}$ is the comb size of the SRS.

By the above formula, in a case that the number of the antenna ports is 4 and the comb size is an even number greater than 4, the corresponding cyclic shift of the sequence and the comb position may be distributed to the four antenna ports, so that the transmission performance of the SRS is improved.

In one implementation manner, in a case that the number of the antenna ports is 4 and an FDM mode is related to the cyclic shift offset value, if $n_{SRS}^{cs} \in \{n_{SRS}^{cs,max}/2, \ldots, n_{SRS}^{cs,max}-1\}$, the four antenna ports of the SRS are distinguished by the FDM, wherein $n_{SRS}^{cs}$ represents the cyclic shift offset value, and $n_{SRS}^{cs,max}$ represents the maximum cyclic shift number; or if $n_{SRS}^{cs} \notin \{n_{SRS}^{cs,max}/2, \ldots, n_{SRS}^{cs,max}-1\}$, the four antenna ports of the SRS are distinguished by at least one of the FDM or the cyclic shift of the sequence, wherein $n_{SRS}^{cs}$ represents the cyclic shift offset value, and $n_{SRS}^{cs,max}$ represents the maximum cyclic shift number; or the four antenna ports of the SRS are distinguished by at least one of the cyclic shift of the sequence or the FDM.

That the FDM mode is related to the cyclic shift offset value may be that it is necessary to consider the influence of the cyclic shift offset value when FDM is performed. It should be noted that, in the embodiments of the present disclosure, it is not limited to how to perform FDM by considering the influence of the cyclic shift offset value, which may be configuration according to the actual scenario requirement. For example: the mapping of the four antenna ports is related to the cyclic shift of the sequence and the FDM, and the FDM mode is related to the cyclic shift offset value ($n_{SRS}^{cs}$), that is, the four antenna ports may be distinguished by the cyclic shift of the sequence and may also be distinguished by FDM, and when the four antenna ports are distinguished by FDM, the influence of the cyclic shift offset value is considered.

If $n_{SRS}^{cs} \in \{n_{SRS}^{cs,max}/2, \ldots, n_{SRS}^{cs,max}-1\}$, that the four antenna ports of the SS are distinguished by FDM may be: when $n_{SRS}^{cs} \in \{n_{SRS}^{cs,max}/2, \ldots, n_{SRS}^{cs,max}-1\}$, the mapping of the antenna ports is only distinguished through FDM without configuring the cyclic shift of the sequence (that is, the mapping of the antenna ports are not distinguished by the cyclic shift of the sequence).

For example: in a case that $n_{SRS}^{cs} \in \{n_{SRS}^{cs,max}/2, \ldots, n_{SRS}^{cs,max}-1\}$;

$$k_{TC}^{(p_i)} = (\bar{k}_{TC} + (p_i - 1000) * K_{TC}/N_{ap}^{SRS}) \bmod K_{TC};$$

or $$k_{TC}^{(p_i)} = (\bar{k}_{TC} + \lfloor (p_i - 1000) * K_{TC}/N_{ap}^{SRS} \rfloor) \bmod K_{TC};$$

or $$k_{TC}^{(p_i)} = (\bar{k}_{TC} + \lceil (p_i - 1000) * K_{TC}/N_{ap}^{SRS} \rceil) \bmod K_{TC};$$

where $k_{TC}^{(p_i)}$ is the comb position where the antenna port i is mapped, $N_{ap}^{SRS}$ represents the number of the antenna ports, $p_i$ represents the index of the antenna port i, $\bar{k}_{TC}$ represents the comb offset value, and $K_{TC}$ is the comb size of the SRS.

If $n_{SRS}^{cs} \notin \{n_{SRS}^{cs,max}/2, \ldots, n_{SRS}^{cs,max}-1\}$, that the four antenna ports of the SRS are distinguished by at least one of FDM or the cyclic shift of the sequence may be: when $n_{SRS}^{cs} \notin \{n_{SRS}^{cs,max}/2, \ldots, n_{SRS}^{cs,max}-1\}$, the mapping of the antenna ports is distinguished by the cyclic shift and FDM.

For example: in a case that $n_{SRS}^{cs} \notin \{n_{SRS}^{cs,max}/2, \ldots, n_{SRS}^{cs,max}-1\}$;

$$n_{SRS}^{cs,i} = \left[n_{SRS}^{cs} + \frac{n_{SRS}^{cs,max} \cdot [(p_i - 1000) \bmod 2] \cdot 2}{N_{ap}^{SRS}} \right] \bmod n_{SRS}^{cs,max},$$

$$k_{TC}^{(p_i)} = \begin{cases} (\bar{k}_{TC} + K_{TC}/2) \bmod K_{TC} & \text{if } p_i \in \{1000, 1001\} \text{(or } p_i \in \{1002, 1003\}) \\ \bar{k}_{TC} & \text{otherwise} \end{cases};$$

or $$n_{SRS}^{cs,i} = \left[n_{SRS}^{cs} + \frac{n_{SRS}^{cs,max} \cdot \lfloor (p_i - 1000)/2 \rfloor \cdot 2}{N_{ap}^{SRS}} \right] \bmod n_{SRS}^{cs,max},$$

$$k_{TC}^{(p_i)} = \begin{cases} (\bar{k}_{TC} + K_{TC}/2) \bmod K_{TC} & \text{if } p_i \in \{1001, 1003\} \text{(or } p_i \in \{1000, 1002\}) \\ \bar{k}_{TC} & \text{otherwise} \end{cases};$$

where $n_{SRS}^{cs,i}$ is the cyclic shift of the sequence to which the antenna port i is mapped, $n_{SRS}^{cs}$ represents the cyclic shift offset value, $N_{ap}^{SRS}$ represents the number of the antenna ports, $n_{SRS}^{cs,max}$ represents the maximum cyclic shift number, $p_i$ represents the index of the antenna port i, $k_{TC}^{(p_i)}$ is the comb position where the antenna port i is mapped, $\bar{k}_{TC}$ represents the comb offset value, and $K_{TC}$ is the comb size of the SRS.

By the above formula, in a case that the number of the antenna ports is 4 and the comb size is an even number greater than 4, the cyclic shift of the sequence and the comb position may be correspondingly distributed to the four antenna ports, so that the transmission performance of the SRS is improved.

In a case that the four antenna ports of the SRS are distinguished by at least one of the cyclic shift of the sequence or the FDM, $$n_{SRS}^{cs,i} = \left[ n_{SRS}^{cs} + \left\lfloor \frac{n_{SRS}^{cs,max} \cdot (p_i - 1000)}{N_{ap}^{SRS}} \right\rfloor \right] \bmod n_{SRS}^{cs,max};$$

or $$n_{SRS}^{cs,i} = \left[ n_{SRS}^{cs} + \left\lceil \frac{n_{SRS}^{cs,max} \cdot (p_i - 1000)}{N_{ap}^{SRS}} \right\rceil \right] \bmod n_{SRS}^{cs,max},$$

$$k_{TC}^{(p_i)} = \begin{cases} (\bar{k}_{TC} + K_{TC}/2) \bmod K_{TC} & \text{if } n_{SRS}^{cs} \in \{n_{SRS}^{cs,max}/2, \ldots, n_{SRS}^{cs,max} - 1\} \text{ and } N_{ap}^{SRS} = 4 \text{ and } p_i \in \{1001, 1003\} \\ \bar{k}_{TC} & \text{otherwise} \end{cases};$$

where $n_{SRS}^{cs,i}$ is the cyclic shift of the sequence to which the antenna port i is mapped, $n_{SRS}^{cs}$ represents the cyclic shift offset value, $N_{ap}^{SRS}$ represents the number of the antenna ports, $n_{SRS}^{cs,max}$ represents the maximum cyclic shift number, $p_i$ represents the index of the antenna port i, $k_{TC}^{(p_i)}$ is the comb position where the antenna port i is mapped, $\bar{k}_{TC}$ represents the comb offset value, and $K_{TC}$ is the comb size of the SRS.

By the above formula, in a case that the number and the antenna ports is 4 and the comb size is an even number greater than 4, the cyclic shift of the sequence and the comb position may be correspondingly distributed to the four antenna ports, so that the transmission performance of the SRS is improved.

In one implementation manner, in a case that the number of the antenna ports is 2 and an FDM mode is unrelated to the cyclic shift offset value.

The two antenna ports of the SRS are distinguished by at least one of the cyclic shift of the sequence or the FDM, wherein that the two antenna ports of the SRS are distinguished by at least one of the cyclic shift of the sequence or the FDM may be: the mapping mode of the antenna ports is related to the FDM and the cyclic shift of the sequence, the FDM mode is unrelated to the cyclic shift offset value (n's), that is, the two antenna ports are distinguished by both FDM and cyclic shift of the sequence.

antenna port i, $k_{TC}^{(p_i)}$ is the comb position where the antenna port i is mapped, $\bar{k}_{TC}$ represents the comb offset value, and $K_{TC}$ is the comb size of the SRS.

By the above formula, in a case that the number of the antenna ports is 2 and the comb size is an even number greater than 4, the cyclic shift of the sequence and the comb position may be correspondingly distributed to the two antenna ports, so that the transmission performance of the SRS is improved.

In one implementation manner, in a case that the number of the antenna ports is 2 and an FDM mode is related to the cyclic shift offset value, if $n_{SRS}^{cs} \in \{n_{SRS}^{cs,max}/2, \ldots, n_{SRS}^{cs,max}-1\}$, the two antenna ports of the SRS are distinguished by at least one of the cyclic shift of the sequence or the FDM; or if $n_{SRS}^{cs} \notin \{n_{SRS}^{cs,max}/2, \ldots, n_{SRS}^{cs,max}-1\}$, the two antenna ports of the SRS are distinguished by the cyclic shift of the sequence.

In this implementation manner, the mapping of the antenna ports may be related to the cyclic shift of the sequence and the FDM, and the FDM mode is related to the cyclic shift offset value ($n_{SRS}^{cs}$). For example, when $n_{SRS}^{cs} \in \{n_{SRS}^{cs,max}/2, \ldots, n_{SRS}^{cs,max}-1\}$, the two antenna ports may be distinguished by the FDM and the cyclic shift of the sequence; and when $n_{SRS}^{cs} \notin \{n_{SRS}^{cs,max}/2, \ldots, n_{SRS}^{cs,max}-1\}$, the two antenna ports may be distinguished only by the cyclic shift of the sequence.

For example:

$$n_{SRS}^{cs,i} = \left[ n_{SRS}^{cs} + \frac{n_{SRS}^{cs,max} \cdot (p_i - 1000)}{N_{ap}^{SRS}} \right] \bmod n_{SRS}^{cs,max},$$

$$k_{TC}^{(p_i)} = \begin{cases} (\bar{k}_{TC} + K_{TC}/2)) \bmod K_{TC} & \text{if } p_i = 1000 (\text{or } 1001) \text{ and } n_{SRS}^{cs} \in \{n_{SRS}^{cs,max}/2, \ldots, n_{SRS}^{cs,max} - 1\} \\ \bar{k}_{TC} & \text{otherwise} \end{cases};$$

For example:

$$n_{SRS}^{cs,i} = \left[ n_{SRS}^{cs} + \frac{n_{SRS}^{cs,max} \cdot (p_i - 1000)}{N_{ap}^{SRS}} \right] \bmod n_{SRS}^{cs,max},$$

$$k_{TC}^{(p_i)} = \begin{cases} (\bar{k}_{TC} + K_{TC}/2) \bmod K_{TC} & \text{if } p_i \in 1000 \text{ (or 1001)} \\ \bar{k}_{TC} & \text{otherwise} \end{cases};$$

where $n_{SRS}^{cs,i}$ is the cyclic shift of the sequence to which the antenna port i is mapped, $n_{SRS}^{cs}$ represents the cyclic shift offset value, $N_{ap}^{SRS}$ represents the number of the antenna ports, $n_{SRS}^{cs,max}$ represents the maximum cyclic shift number, $p_i$ represents the index of the where $n_{SRS}^{cs,i}$ is the cyclic shift of the sequence to which the antenna port i is mapped, $n_{SRS}^{cs}$ represents the cyclic shift offset value, $N_{ap}^{SRS}$ represents the number of the antenna ports, $n_{SRS}^{cs,max}$ represents the maximum cyclic shift number, $p_i$ represents the index of the antenna port i, $k_{TC}^{(p_i)}$ is the comb position where the antenna port i is mapped, $\bar{k}_{TC}$ represents the comb offset value, and $K_{TC}$ is the comb size of the SRS.

By the above formula, in a case that the number of the antenna ports is 2 and the comb size is an even number greater than 4, the cyclic shift of the sequence and the comb position may be correspondingly distributed to the two antenna ports, so that the transmission performance of the SRS is improved.

In one implementation manner, in a case that the number of the antenna ports is 4 and an FDM mode is unrelated to the cyclic shift offset value, $$k_{TC}^{(p_i)} = (\bar{k}_{TC} + (p_i - 1000) * K_{TC}/N_{ap}^{SRS}) \bmod K_{TC};$$

or $$k_{TC}^{(p_i)} = (\bar{k}_{TC} + \lfloor (p_i - 1000) * K_{TC}/N_{ap}^{SRS} \rfloor) \bmod K_{TC};$$

or $$k_{TC}^{(p_i)} = (\bar{k}_{TC} + \lceil (p_i - 1000) * K_{TC}/N_{ap}^{SRS} \rceil) \bmod K_{TC};$$

where $k_{TC}^{(p_i)}$ is the comb position where the antenna port i is mapped, $\bar{k}_{TC}$ represents the comb offset value, $p_i$ represents the index of the antenna port i, $K_{TC}$ is the comb size of the SRS, and $N_{ap}^{SRS}$ represents the number of the antenna ports.

That the FDM mode is unrelated to the cyclic shift offset value may be: the four antenna ports are related to the FDM and unrelated to the cyclic shift of the sequence, and the FDM mode is unrelated to the cyclic shift offset value ($n_{SRS}^{cs}$), that is, the antenna ports may be distinguished only by the FDM, the cyclic shift of the sequence may not be configured, and the FDM mode is not influenced by $n_{SRS}^{cs}$.

In one implementation manner, in a case that the number of the antenna ports is 2 and an FDM mode is unrelated to the cyclic shift offset value, $$k_{TC}^{(p_i)} = \begin{cases} (\bar{k}_{TC} + K_{TC}/2) \bmod K_{TC} & \text{if } p_i \in 1000 \text{ (or 1001)} \\ \bar{k}_{TC} & \text{otherwise} \end{cases};$$

where $k_{TC}^{(p_i)}$ is the comb position where the antenna port i is mapped, $\bar{k}_{TC}$ represents the comb offset value, $p_i$ represents the index of the antenna port i, $K_{TC}$ is the comb size of the SRS, and $N_{ap}^{SRS}$ represents the number of the antenna ports.

That the number of the antenna ports is 2 and the FDM mode is unrelated to the cyclic shift offset value may be: the two antenna ports are related to the FDM and unrelated to the cyclic shift of the sequence, and the FDM mode is unrelated to the cyclic shift offset value ($n_{SRS}^{cs}$), that is, the antenna ports may be distinguished only by the FDM, the cyclic shift of the sequence may not be configured, and the FDM mode is not influenced by $n_{SRS}^{cs}$.

In one implementation manner, in a case that the number of the antenna ports is 4,
the cyclic shift of the sequence is calculated by the following formula:

$$n_{SRS}^{cs,i} = \left[ n_{SRS}^{cs} + \left\lfloor \frac{n_{SRS}^{cs,max} \cdot (p_i - 1000)}{N_{ap}^{SRS}} \right\rfloor \right] \bmod n_{SRS}^{cs,max};$$

or $$n_{SRS}^{cs,i} = \left[ n_{SRS}^{cs} + \left\lceil \frac{n_{SRS}^{cs,max} \cdot (p_i - 1000)}{N_{ap}^{SRS}} \right\rceil \right] \bmod n_{SRS}^{cs,max};$$

the comb position is calculated by the following formula:

$$k_{TC}^{(p_i)} = \bar{k}_{TC};$$

in a case that the number of the antenna ports is 2, $$n_{SRS}^{cs,i} = \left[ n_{SRS}^{cs} + \frac{n_{SRS}^{cs,max} \cdot (p_i - 1000)}{N_{ap}^{SRS}} \right] \bmod n_{SRS}^{cs,max},$$

$$k_{TC}^{(p_i)} = \bar{k}_{TC};$$

where $n_{SRS}^{cs,i}$ is the cyclic shift of the sequence to which the antenna port i is mapped, $n_{SRS}^{cs}$ represents the cyclic shift offset value, $N_{ap}^{SRS}$ represents the number of the antenna ports, $n_{SRS}^{cs,max}$ represents the maximum cyclic shift number, $p_i$ represents the index of the antenna port i, $k_{TC}^{(p_i)}$ is the comb position where the antenna port i is mapped, $\bar{k}_{TC}$ represents the comb offset value.

In this implementation manner, the antenna ports may only be related to the cyclic shift of the sequence and unrelated to the FDM, that is, the antenna ports may be distinguished only by the cyclic shift of the sequence.

As an optional implementation manner, the comb offset value during mapping of the antenna port i is the lowest RE position in one RB of one OFDM symbol where the SRS is located in a case that the number of the antenna port is configured to 1, wherein the antenna port i is any antenna of the SRS; or
the comb offset value is configured by network side, for example, the comb offset value may be indicated by combOffset in a transmissionComb field in an RRC signaling. Of course, this is not limited, for example: the comb offset value may be indicated by other fields in the RRC signaling.

The above one OFDM symbol may be any symbol where the SRS is located when the number of the antenna ports is configured to 1, or one specific OFDM may be called a certain OFDM symbol, and the above one RB may be a starting RB, or a certain RB of other RBs.

The lowest RE position may also called the lowest RE offset.

As an optional implementation manner, the SRS is an SRS for positioning.

In this way, due to the good coverage effect and high audibility of the SRS, the positioning effect is more excellent.

For example, the number of the antenna ports of the SRS may be limited to 1 or 2. Optionally, it may be agreed by a protocol or indicated by a network.

For example, when the comb size is 8, the maximum cyclic shift number may be 6, 3 or 2, when the comb size is 6, the maximum cyclic shift number may be 8, 4 or 2; and when the comb size is 12, the maximum cyclic shift number may be 4 or 2. Optionally, the maximum cyclic shift number may be agreed by a protocol or indicated by a network.

For example, the SRS may be called an SRS resource.

In a case that the SRS is an SRS for positioning, the number of the antenna ports of the SRS may be limited to 1 or 2, so that the cyclic shift of the sequence is distributed better; moreover, the comb position where the antenna ports are mapped is also distributed better, and the orthogonality among the antenna ports is higher, so that the transmission performance of the SRS is improved.

It should be noted that, that the number of the antenna ports of the SRS may be limited to 1 or 2 may be agreed by a protocol or indicated by a network; moreover, in this implementation manner, it is preferentially applied to a structure with a combs size of 8 (comb-8), of course, this is not limited, for example: it may also be applied to the structures with a comb size of 6 (comb-6) and a comb size of 12 (comb-12).

In addition, in the above implementation manner, the mode of determining mapping of the antenna ports may adopt a determination mode provided by the present invention to determine the mapping of the antenna ports, of course, may reuse a defined determination mode which determines the comb size as 2 or 4 of the protocol, or may adopt a mode for determining mapping newly defined by the subsequent protocol version.

As an optional implementation manner, at least one of the comb size, the number of the antenna ports or a mode for determining the mapping is agreed by a protocol or indicated by a network.

For example: the above at least one may be indicated by at least one of a radio resource control (RRC) signaling, a medium access control control element (MAC CE) or a downlink control information (DCI) signaling, for example, a plurality of signaling indicate the above at least one, or a certain signal indicates the above at least one.

The mode for determining the mapping may be various modes for determining the cyclic shift of the sequence and the comb position provided by the embodiments of the present disclosure.

In the embodiments of the present disclosure, mapping of the antenna ports of the SRS is determined according to the number of the antenna ports of the SRS, wherein the SRS is an SRS with a comb size of N, N is an even number greater than 4, and the number of the antenna ports is 1, 2 or 4. In this way, mapping of the antenna ports of the SRS with a comb size greater than 4 can be realized, so that SRS transmission with the comb size greater than 4 is supported, the SRS is more sparse, and the coverage effect and audibility of the SRS can be improved.

Figure 3:
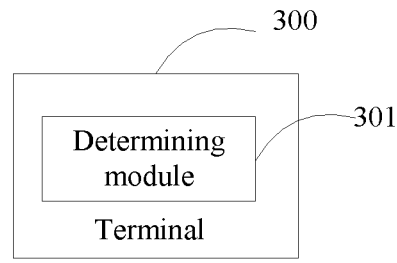
FIG. 3 is a structural diagram of a terminal according to an embodiment of the present disclosure.

Referring to FIG. 3, FIG. 3 is a structural diagram of a terminal according to an embodiment of the present disclosure. As shown in FIG. 3, the terminal 300 includes:

a determining module 301, configured to determine mapping of antenna ports of an SRS according to the number of the antenna ports of the SRS, wherein the SRS is an SRS with a comb size of N, N is an even number greater than 4, and the number of the antenna ports is 1, 2 or 4.

Optionally, the mapping of the antenna ports of the SRS includes at least one of:
  a cyclic shift of a sequence to which the antenna ports of the SRS are mapped; or
  a comb position where the antenna ports of the SRS are mapped.

Optionally, the cyclic shift of the sequence is determined according to at least one of a cyclic shift offset value, a maximum cyclic shift number or an antenna port index; and/or
  the comb position is determined according to at least one of whether frequency division multiplexing (FDM) is performed, a comb offset value, a maximum cyclic shift number, an antenna port index or a comb size of the SRS.

Optionally, in a case that the number of the antenna ports is 4 and an FDM mode is unrelated to the cyclic shift offset value,
  the four antenna ports of the SRS are divided into two groups, the antenna ports in the same group are mapped to the same comb position, the antenna ports in the same group are mapped to different sequences of the cyclic shift, and the antenna ports in different groups are mapped to different comb positions; or
  the four antenna ports of the SRS are distinguished by at least one of the cyclic shift of the sequence or the FDM.

Optionally, in a case that the four antenna ports of the SRS are divided into two groups, $$n_{SRS}^{cs,i} = \left[ n_{SRS}^{cs} + \frac{n_{SRS}^{cs,max} \cdot [(p_i - 1000) \bmod 2] \cdot 2}{N_{ap}^{SRS}} \right] \bmod n_{SRS}^{cs,max},$$

$$k_{TC}^{(p_i)} = \begin{cases} (\bar{k}_{TC} + K_{TC}/2) \bmod K_{TC} & \text{if } p_i \in \{1000, 1001\} (\text{or } p_i \in \{1002, 1003\}) \\ \bar{k}_{TC} & \text{otherwise} \end{cases};$$

or $$n_{SRS}^{cs,i} = \left[ n_{SRS}^{cs} + \frac{n_{SRS}^{cs,max} \cdot \lfloor (p_i - 1000) \bmod 2 \rfloor \cdot 2}{N_{ap}^{SRS}} \right] \bmod n_{SRS}^{cs,max},$$

$$k_{TC}^{(p_i)} = \begin{cases} (\bar{k}_{TC} + K_{TC}/2) \bmod K_{TC} & \text{if } p_i \in \{1001, 1003\} (\text{or } p_i \in \{1000, 1002\}) \\ \bar{k}_{TC} & \text{otherwise} \end{cases};$$

where $n_{SRS}^{cs,i}$ is the cyclic shift of the sequence to which the antenna port i is mapped, $n_{SRS}^{cs}$ represents the cyclic shift offset value, $N_{ap}^{SRS}$ represents the number of the antenna ports, $n_{SRS}^{cs,max}$ represents the maximum cyclic shift number, $p_i$ represents the index of the antenna port i, $k_{TC}^{(p_i)}$ is the comb position where the antenna port i is mapped, $\bar{k}_{TC}$ represents the comb offset value, and $K_{TC}$ is the comb size of the SRS.

Optionally, in a case that the four antenna ports of the SRS are distinguished by at least one of the cyclic shift of the sequence or the FDM,
  the cyclic shift of the sequence is calculated by the following formula:

$$n_{SRS}^{cs,i} = \left[ n_{SRS}^{cs} + \left\lfloor \frac{n_{SRS}^{cs,max} \cdot (p_i - 1000)}{N_{ap}^{SRS}} \right\rfloor \right] \bmod n_{SRS}^{cs,max};$$

or $$n_{SRS}^{cs,i} = \left[ n_{SRS}^{cs} + \left\lceil \frac{n_{SRS}^{cs,max} \cdot (p_i - 1000)}{N_{ap}^{SRS}} \right\rceil \right] \bmod n_{SRS}^{cs,max},$$

the comb position is calculated by the following formula:

$$k_{TC}^{(p_i)} = \begin{cases} (\bar{k}_{TC} + K_{TC}/2) \bmod K_{TC} & \text{if } p_i \in \{1001, 1003\} (\text{or } p_i \in \{1000, 1002\}) \\ \bar{k}_{TC} & \text{otherwise} \end{cases};$$

or $$k_{TC}^{(p_i)} = (\bar{k}_{TC} + (p_i - 1000) * K_{TC}/N_{ap}^{SRS}) \bmod K_{TC};$$

or $$k_{TC}^{(p_i)} = (\bar{k}_{TC} + \lfloor (p_i - 1000) * K_{TC}/N_{ap}^{SRS} \rfloor) \bmod K_{TC};$$

or $$k_{TC}^{(p_i)} = (\bar{k}_{TC} + \lceil (p_i - 1000) * K_{TC}/N_{ap}^{SRS} \rceil) \bmod K_{TC};$$

where $n_{SRS}^{cs,i}$ is the cyclic shift of the sequence to which the antenna port i is mapped, $n_{SRS}^{cs}$ represents the cyclic shift offset value, $N_{ap}^{SRS}$ represents the number of the antenna ports, $n_{SRS}^{cs,max}$ represents the maximum cyclic shift number, $p_i$ represents the index of the antenna port i, $k_{TC}^{(p_i)}$ is the comb position where the antenna port i is mapped, $\bar{k}_{TC}$ represents the comb offset value, and $K_{TC}$ is the comb size of the SRS.

Optionally, in a case that the number of the antenna ports is 4 and an FDM mode is related to the cyclic shift offset value, if $n_{SRS}^{cs} \in \{n_{SRS}^{cs,max}/2, \ldots, n_{SRS}^{cs,max}-1\}$, the four antenna ports of the SRS are distinguished by the FDM, wherein $n_{SRS}^{cs}$ represents the cyclic shift offset value, and $n_{SRS}^{cs,max}$ represents the maximum cyclic shift number; or if $n_{SRS}^{cs} \notin \{n_{SRS}^{cs,max}/2, \ldots, n_{SRS}^{cs,max}-1\}$, the four antenna ports of the SRS are distinguished by at least one of the FDM or the cyclic shift of the sequence, wherein $n_{SRS}^{cs}$ represents the cyclic shift offset value, and $n_{SRS}^{cs,max}$ represents the maximum cyclic shift number; or the four antenna ports of the SRS are distinguished by at least one of the cyclic shift of the sequence or the FDM.

$$n_{SRS}^{cs,i} = \left[n_{SRS}^{cs} + \left\lfloor\frac{n_{SRS}^{cs,max} \cdot (p_i - 1000)}{N_{ap}^{SRS}}\right\rfloor\right] \bmod n_{SRS}^{cs,max};$$

or $$n_{SRS}^{cs,i} = \left[n_{SRS}^{cs} + \left\lceil\frac{n_{SRS}^{cs,max} \cdot (p_i - 1000)}{N_{ap}^{SRS}}\right\rceil\right] \bmod n_{SRS}^{cs,max},$$

$$k_{TC}^{(p_i)} = \begin{cases} (\bar{k}_{TC} + K_{TC}/2) \bmod K_{TC} & \text{if } n_{SRS}^{cs} \in \{n_{SRS}^{cs,max}/2, \ldots, n_{SRS}^{cs,max}-1\} \text{ and } N_{ap}^{SRS} = 4 \text{ and } p_i \in \{1001, 1003\} \\ \bar{k}_{TC} & \text{otherwise} \end{cases};$$

Optionally, in a case that $n_{SRS}^{cs} \notin \{n_{SRS}^{cs,max}/2, \ldots, n_{SRS}^{cs,max}-1\}$;

$$k_{TC}^{(p_i)} = (\bar{k}_{TC} + (p_i - 1000) * K_{TC}/N_{ap}^{SRS}) \bmod K_{TC};$$

or $$k_{TC}^{(p_i)} = (\bar{k}_{TC} + \lfloor(p_i - 1000) * K_{TC}/N_{ap}^{SRS}\rfloor) \bmod K_{TC};$$

or $$k_{TC}^{(p_i)} = (\bar{k}_{TC} + \lceil(p_i - 1000) * K_{TC}/N_{ap}^{SRS}\rceil) \bmod K_{TC};$$

in a case that $n_{SRS}^{cs} \notin \{n_{SRS}^{cs,max}/2, \ldots, n_{SRS}^{cs,max}-1\}$;

$$n_{SRS}^{cs,i} = \left[n_{SRS}^{cs} + \frac{n_{SRS}^{cs,max} \cdot [(p_i - 1000) \bmod 2] \cdot 2}{N_{ap}^{SRS}}\right] \bmod n_{SRS}^{cs,max},$$

$$k_{TC}^{(p_i)} = \begin{cases} (\bar{k}_{TC} + K_{TC}/2) \bmod K_{TC} & \text{if } p_i \in \{1000, 1001\}(\text{or } p_i \in \{1002, 1003\}) \\ \bar{k}_{TC} & \text{otherwise} \end{cases};$$

or $$n_{SRS}^{cs,i} = \left[n_{SRS}^{cs} + \frac{n_{SRS}^{cs,max} \cdot \lfloor(p_i - 1000)/2\rfloor \cdot 2}{N_{ap}^{SRS}}\right] \bmod n_{SRS}^{cs,max},$$

$$k_{TC}^{(p_i)} = \begin{cases} (\bar{k}_{TC} + K_{TC}/2) \bmod K_{TC} & \text{if } p_i \in \{1001, 1003\}(\text{or } p_i \in \{1000, 1002\}) \\ \bar{k}_{TC} & \text{otherwise} \end{cases};$$

where $n_{SRS}^{cs,i}$ is the cyclic shift of the sequence to which the antenna port i is mapped, $n_{SRS}^{cs}$ represents the cyclic shift offset value, $N_{ap}^{SRS}$ represents the number of the antenna ports, $n_{SRS}^{cs,max}$ represents the maximum cyclic shift number, $p_i$ represents the index of the antenna port i, $k_{TC}^{(p_i)}$ is the comb position where the antenna port i is mapped, $\bar{k}_{TC}$ represents the comb offset value, and $K_{TC}$ is the comb size of the SRS.

Optionally, in a case that the four antenna ports of the SRS are distinguished by at least one of the cyclic shift of the sequence distinguished or the FDM, $$n_{SRS}^{cs,i} = \left[n_{SRS}^{cs} + \left\lfloor\frac{n_{SRS}^{cs,max} \cdot (p_i - 1000)}{N_{ap}^{SRS}}\right\rfloor\right] \bmod n_{SRS}^{cs,max};$$

or $$n_{SRS}^{cs,i} = \left[n_{SRS}^{cs} + \left\lceil\frac{n_{SRS}^{cs,max} \cdot (p_i - 1000)}{N_{ap}^{SRS}}\right\rceil\right] \bmod n_{SRS}^{cs,max},$$

where $n_{SRS}^{cs,i}$ is the cyclic shift of the sequence to which the antenna port i is mapped, $n_{SRS}^{cs}$ represents the cyclic shift offset value, $N_{ap}^{SRS}$ represents the number of the antenna ports, $n_{SRS}^{cs,max}$ represents the maximum cyclic shift number, $p_i$ represents the index of the antenna port i, $k_{TC}^{(p_i)}$ is the comb position where the antenna port i is mapped, $\bar{k}_{TC}$ represents the comb offset value, and $K_{TC}$ is the comb size of the SRS.

Optionally, in a case that the number of the antenna ports is 2 and an FDM mode is unrelated to the cyclic shift offset value.

The two antenna ports of the SRS are distinguished by at least one of the cyclic shift of the sequence or the FDM.

Optionally, $$n_{SRS}^{cs,i} = \left[n_{SRS}^{cs} + \frac{n_{SRS}^{cs,max} \cdot (p_i - 1000)}{N_{ap}^{SRS}}\right] \bmod n_{SRS}^{cs,max},$$

-continued $$k_{TC}^{(p_i)} = \begin{cases} (\bar{k}_{TC} + K_{TC}/2) \bmod K_{TC} & \text{if } p_i = 1000 \text{ (or 1001)} \\ \bar{k}_{TC} & \text{otherwise} \end{cases};$$

where $n_{SRS}^{cs,i}$ is the cyclic shift of the sequence to which the antenna port i is mapped, $n_{SRS}^{cs}$ represents the cyclic shift offset value, $N_{ap}^{SRS}$ represents the number of the antenna ports, $n_{SRS}^{cs,max}$ represents the maximum cyclic shift number, $p_i$ represents the index of the antenna port i, $k_{TC}^{(p_i)}$ is the comb position where the antenna port i is mapped, $\bar{k}_{TC}$ represents the comb offset value, and $K_{TC}$ is the comb size of the SRS.

Optionally, in a case that the number of the antenna ports is 2 and an FDM mode is related to the cyclic shift offset value, if $n_{SRS}^{cs} \in \{n_{SRS}^{cs,max}/2, \ldots, n_{SRS}^{cs,max}-1\}$, the two antenna ports of the SRS are distinguished by at least one of the cyclic shift of the sequence or the FDM; or if $n_{SRS}^{cs} \notin \{n_{SRS}^{cs,max}/2, \ldots, n_{SRS}^{cs,max}-1\}$, the two antenna ports of the SRS are distinguished by the cyclic shift of the sequence.

Optionally, $$n_{SRS}^{cs,i} = \left[n_{SRS}^{cs} + \left\lfloor \frac{n_{SRS}^{cs,max} \cdot (p_i - 1000)}{N_{ap}^{SRS}} \right\rfloor \right] \bmod n_{SRS}^{cs,max},$$

$$k_{TC}^{(p_i)} = \begin{cases} (\bar{k}_{TC} + K_{TC}/2) \bmod K_{TC} & \text{if } p_i = 1000 \text{ (or 1001) and } n_{SRS}^{cs} \in \{n_{SRS}^{cs,max}/2, \ldots, n_{SRS}^{cs,max} - 1\} \\ \bar{k}_{TC} & \text{otherwise} \end{cases};$$

where $n_{SRS}^{cs,i}$ is the cyclic shift of the sequence to which the antenna port i is mapped, $n_{SRS}^{cs}$ represents the cyclic shift offset value, $N_{ap}^{SRS}$ represents the number of the antenna ports, $n_{SRS}^{cs,max}$ represents the maximum cyclic shift number, $p_i$ represents the index of the antenna port i, $k_{TC}^{(p_i)}$ is the comb position where the antenna port i is mapped, $\bar{k}_{TC}$ represents the comb offset value, and $K_{TC}$ is the comb size of the SRS.

Optionally, in a case that the number of the antenna ports is 4 and an FDM mode is unrelated to the cyclic shift offset value, $$k_{TC}^{(p_i)} = (\bar{k}_{TC} + (p_i - 1000) * K_{TC}/N_{ap}^{SRS}) \bmod K_{TC};$$

or $$k_{TC}^{(p_i)} = (\bar{k}_{TC} + \lfloor (p_i - 1000) * K_{TC}/N_{ap}^{SRS} \rfloor) \bmod K_{TC};$$

or $$k_{TC}^{(p_i)} = (\bar{k}_{TC} + \lceil (p_i - 1000) * K_{TC}/N_{ap}^{SRS} \rceil) \bmod K_{TC};$$

where $k_{TC}^{(p_i)}$ is the comb position where the antenna port i, $\bar{k}_{TC}$ represents the comb offset value, $p_i$ represents the index of the antenna port i, $K_{TC}$ is the comb size of the SRS, and $N_{ap}^{SRS}$ represents the number of the antenna ports.

Optionally, in a case that the number of the antenna ports is 2 and an FDM mode is unrelated to the cyclic shift offset value, $$k_{TC}^{(p_i)} = \begin{cases} (\bar{k}_{TC} + K_{TC}/2) \bmod K_{TC} & \text{if } p_i = 1000 \text{ (or 1001)} \\ \bar{k}_{TC} & \text{otherwise} \end{cases};$$

where $k_{TC}^{(p_i)}$ is the comb position where the antenna port i, $\bar{k}_{TC}$ represents the comb offset value, $p_i$ represents the index of the antenna port i, $K_{TC}$ is the comb size of the SRS, and $N_{ap}^{SRS}$ represents the number of the antenna ports.

Optionally, in a case that the number of the antenna ports is 4, the cyclic shift of the sequence is calculated by the following formula:

$$n_{SRS}^{cs,i} = \left[n_{SRS}^{cs} + \left\lfloor \frac{n_{SRS}^{cs,max} \cdot (p_i - 1000)}{N_{ap}^{SRS}} \right\rfloor \right] \bmod n_{SRS}^{cs,max};$$

-continued or $$n_{SRS}^{cs,i} = \left[n_{SRS}^{cs} + \left\lfloor \frac{n_{SRS}^{cs,max} \cdot (p_i - 1000)}{N_{ap}^{SRS}} \right\rfloor \right] \bmod n_{SRS}^{cs,max},$$

the comb position is calculated by the following formula:

$$k_{TC}^{(p_i)} = \bar{k}_{TC};$$

in a case that the number of the antenna ports is 2, $$n_{SRS}^{cs,i} = \left[n_{SRS}^{cs} + \left\lfloor \frac{n_{SRS}^{cs,max} \cdot (p_i - 1000)}{N_{ap}^{SRS}} \right\rfloor \right] \bmod n_{SRS}^{cs,max},$$

$$k_{TC}^{(p_i)} = \bar{k}_{TC};$$

where $n_{SRS}^{cs,i}$ is the cyclic shift of the sequence to which the antenna port i is mapped, $n_{SRS}^{cs}$ represents the cyclic shift offset value, $N_{ap}^{SRS}$ represents the number of the antenna ports, $n_{SRS}^{cs,max}$ represents the maximum cyclic shift number, $p_i$ represents the index of the antenna port i, $k_{TC}^{(p_i)}$ is the comb position where the antenna port i is mapped, $\bar{k}_{TC}$ represents the comb offset value.

Optionally, the comb offset value during mapping of the antenna port i is the lowest resource element (RE) position in one RB of one OFDM symbol where the SRS is located in a case that the number of the antenna port is configured to 1, wherein the antenna port i is any antenna of the SRS; or the comb offset value is configured by network side.

Optionally, the SRS is an SRS for positioning.

Optionally, the number of the antenna ports of the SRS is limited to 1 or 2.

Optionally, at least one of the comb size, the number of the antenna ports or a mode for determining the mapping is agreed by a protocol or indicated by a network.

The terminal provided by the embodiments of the present disclosure can implement the processes implemented by the terminal in the method embodiment in FIG. 2. To avoid repetition, details are not described herein again. The coverage effect and the audibility of the SRS can be improved.

Figure 4:
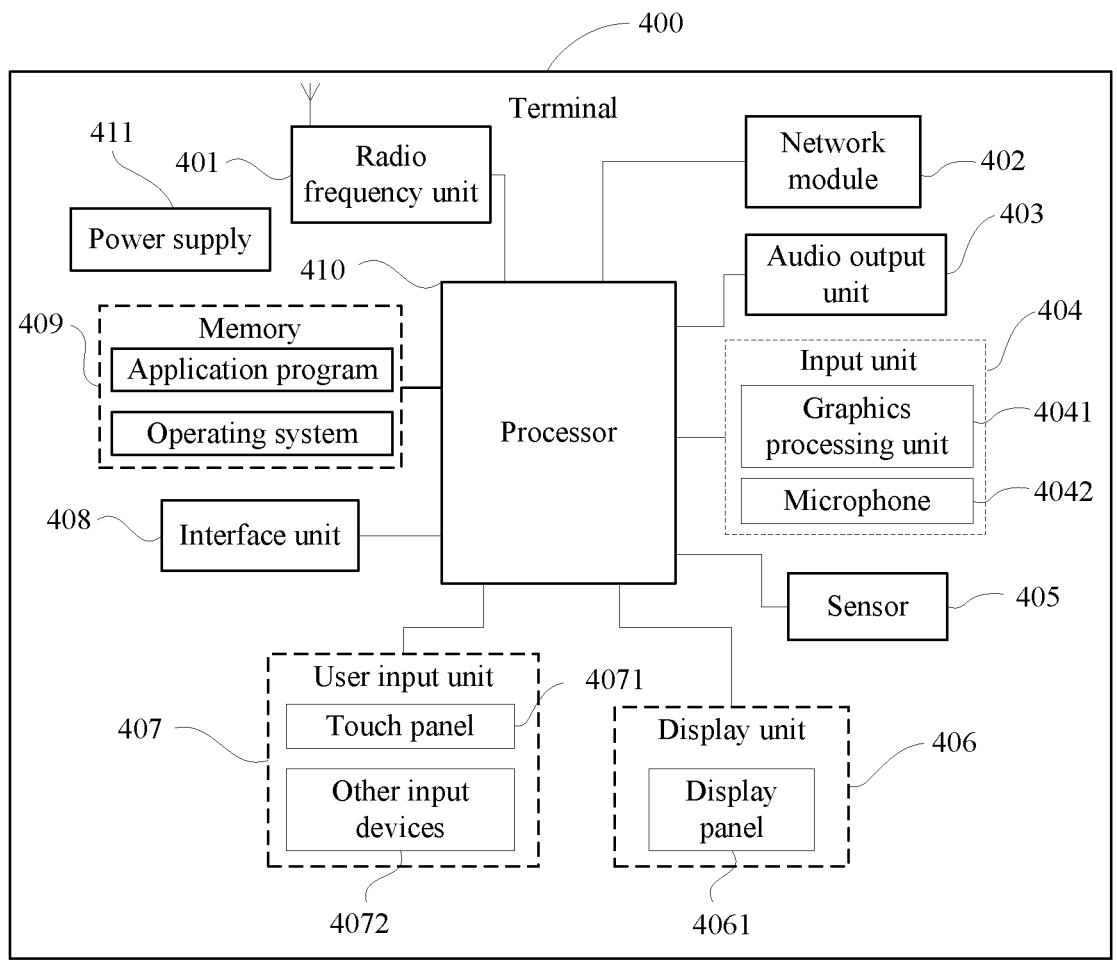
FIG. 4 is a structural diagram of another terminal according to an embodiment of the present disclosure.

FIG. 4 is a schematic diagram of a hardware structure of a terminal according to embodiments of the present disclosure.

The terminal 400 includes, but is not limited to: a radio frequency unit 401, a network module 402, an audio output unit 403, an input unit 404, a sensor 405, a display unit 406, a user input unit 407, an interface unit 408, a memory 409, a processor 410 and a power supply 411. Those skilled in the art may understand that the terminal structure shown in FIG. 4 does not constitute a limitation on the terminal. The terminal may include more or fewer components than those shown in the figure, or some components may be combined, or there may be a different component arrangement. In this embodiment of the present disclosure, the terminal includes but is not limited to a mobile phone, a tablet computer, a notebook computer, a palmtop computer, an in-vehicle terminal, a robot, a wearable device, a pedometer, and the like.

The processor 410 is configured to determine mapping of antenna ports of an SRS according to the number of the antenna ports of the SRS, wherein the SRS is an SRS with a comb size of N, N is an even number greater than 4, and the number of the antenna ports is 1, 2 or 4.

Optionally, the mapping of the antenna ports of the SRS includes at least one of:

a cyclic shift of a sequence to which the antenna ports of the SRS are mapped; or a comb position where the antenna ports of the SRS are mapped.

Optionally, the cyclic shift of the sequence is determined according to at least one of a cyclic shift offset value, a maximum cyclic shift number or an antenna port index; and/or the comb position is determined according to at least one of whether frequency division multiplexing (FDM) is performed, a comb offset value, a maximum cyclic shift number, an antenna port index or a comb size of the SRS.

Optionally, in a case that the number of the antenna ports is 4 and an FDM mode is unrelated to the cyclic shift offset value, the four antenna ports of the SRS are divided into two groups, the antenna ports in the same group are mapped to the same comb position, the antenna ports in the same group are mapped to different sequences of the cyclic shift, and the antenna ports in different groups are mapped to different comb positions; or the four antenna ports of the SRS are distinguished by at least one of the cyclic shift of the sequence or the FDM.

Optionally, in a case that the four antenna ports of the SRS are divided into two, $$n_{SRS}^{cs,i} = \left[ n_{SRS}^{cs} + \frac{n_{SRS}^{cs,max} \cdot [(p_i - 1000) \bmod 2] \cdot 2}{N_{ap}^{SRS}} \right] \bmod n_{SRS}^{cs,max},$$

$$k_{TC}^{(p_i)} = \begin{cases} (\bar{k}_{TC} + K_{TC}/2) \bmod K_{TC} & \text{if } p_i = \{1000, 1001\}(\text{or } p_i \in \{1002, 1003\}) \\ \bar{k}_{TC} & \text{otherwise} \end{cases};$$

or $$n_{SRS}^{cs,i} = \left[ n_{SRS}^{cs} + \frac{n_{SRS}^{cs,max} \cdot \lfloor (p_i - 1000) \bmod 2 \rfloor \cdot 2}{N_{ap}^{SRS}} \right] \bmod n_{SRS}^{cs,max};$$

$$k_{TC}^{(p_i)} = \begin{cases} (\bar{k}_{TC} + K_{TC}/2) \bmod K_{TC} & \text{if } p_i = \{1001, 1003\}(\text{or } p_i \in \{1000, 1002\}) \\ \bar{k}_{TC} & \text{otherwise} \end{cases};$$

where $n_{SRS}^{cs,i}$ is the cyclic shift of the sequence to which the antenna port i is mapped, $n_{SRS}^{cs}$ represents the cyclic shift offset value, $N_{ap}^{SRS}$ represents the number of the antenna ports, $n_{SRS}^{cs,max}$ represents the maximum cyclic shift number, $p_i$ represents the index of the antenna port i, $k_{TC}^{(p_i)}$ is the comb position where the antenna port i is mapped, $\bar{k}_{TC}$ represents the comb offset value, and $K_{TC}$ is the comb size of the SRS.

Optionally, in a case that the four antenna ports of the SRS are distinguished by at least one of the cyclic shift of the sequence or the FDM, the cyclic shift of the sequence is calculated by the following formula:

$$n_{SRS}^{cs,i} = \left[ n_{SRS}^{cs} + \left\lfloor \frac{n_{SRS}^{cs,max} \cdot (p_i - 1000)}{N_{ap}^{SRS}} \right\rfloor \right] \bmod n_{SRS}^{cs,max};$$

or, $$n_{SRS}^{cs,i} = \left[ n_{SRS}^{cs} + \left\lceil \frac{n_{SRS}^{cs,max} \cdot (p_i - 1000)}{N_{ap}^{SRS}} \right\rceil \right] \bmod n_{SRS}^{cs,max};$$

the comb position is calculated by the following formula:

$$k_{TC}^{(p_i)} = \begin{cases} (\bar{k}_{TC} + K_{TC}/2) \bmod K_{TC} & \text{if } p_i \in \{1001, 1003\}(\text{or } p_i \in \{1000, 1002\}) \\ \bar{k}_{TC} & \text{otherwise} \end{cases};$$

or $$k_{TC}^{(p_i)} = (\bar{k}_{TC} + (p_i - 1000) * K_{TC}/N_{ap}^{SRS}) \bmod K_{TC};$$

or $$k_{TC}^{(p_i)} = (\bar{k}_{TC} + \lfloor (p_i - 1000) * K_{TC}/N_{ap}^{SRS} \rfloor) \bmod K_{TC};$$

or $$k_{TC}^{(p_i)} = (\bar{k}_{TC} + \lceil (p_i - 1000) * K_{TC}/N_{ap}^{SRS} \rceil) \bmod K_{TC};$$

where $n_{SRS}^{cs,i}$ is the cyclic shift of the sequence to which the antenna port i is mapped, $n_{SRS}^{cs}$ represents the cyclic shift offset value, $N_{ap}^{SRS}$ represents the number of the antenna ports, $n_{SRS}^{cs,max}$ represents the maximum cyclic shift number, $p_i$ represents the index of the antenna port i, $k_{TC}^{(p_i)}$ is the comb position where the antenna port i is mapped, $\overline{k}_{TC}$ represents the comb offset value, and $K_{TC}$ is the comb size of the SRS.

Optionally, in a case that the number of the antenna ports is 4 and an FDM mode is related to the cyclic shift offset value, if $n_{SRS}^{cs} \in \{n_{SRS}^{cs,max}/2, \ldots, n_{SRS}^{cs,max}-1\}$, the four antenna ports of the SRS are distinguished by the FDM, wherein $n_{SRS}^{cs}$ represents the cyclic shift offset value, and $n_{SRS}^{cs,max}$ represents the maximum cyclic shift number; or $$n_{SRS}^{cs,i} = \left[n_{SRS}^{cs} + \left\lfloor \frac{n_{SRS}^{cs,max} \cdot (p_i - 1000)}{N_{ap}^{SRS}} \right\rfloor \right] \bmod n_{SRS}^{cs,max};$$

or, $$n_{SRS}^{cs,i} = \left[n_{SRS}^{cs} + \left\lceil \frac{n_{SRS}^{cs,max} \cdot (p_i - 1000)}{N_{ap}^{SRS}} \right\rceil \right] \bmod n_{SRS}^{cs,max};$$

$$k_{TC}^{(p_i)} = \begin{cases} (\overline{k}_{TC} + K_{TC}/2) \bmod K_{TC} & \text{if } n_{SRS}^{cs} \in \{n_{SRS}^{cs,max}/2, \ldots, n_{SRS}^{cs,max} - 1\} \text{ and } N_{ap}^{SRS} = 4 \text{ and } p_i \in \{1001, 1003\} \\ \overline{k}_{TC} & \text{otherwise} \end{cases};$$

if $n_{SRS}^{cs} \notin \{n_{SRS}^{cs,max}/2, \ldots, n_{SRS}^{cs,max}-1\}$, the four antenna ports of the SRS are distinguished by at least one of the FDM or the cyclic shift of the sequence, wherein $n_{SRS}^{cs}$ represents the cyclic shift offset value, and $n_{SRS}^{cs,max}$ represents the maximum cyclic shift number; or the four antenna ports of the SRS are distinguished by at least one of the cyclic shift of the sequence or the FDM.

Optionally, in a case that $n_{SRS}^{cs} \in \{n_{SRS}^{cs,max}/2, \ldots, n_{SRS}^{cs,max}-1\}$;

$$k_{TC}^{(p_i)} = (\overline{k}_{TC} + (p_i - 1000) * K_{TC}/N_{ap}^{SRS}) \bmod K_{TC};$$

or $$k_{TC}^{(p_i)} = (\overline{k}_{TC} + \lfloor (p_i - 1000) * K_{TC}/N_{ap}^{SRS} \rfloor) \bmod K_{TC};$$

or $$k_{TC}^{(p_i)} = (\overline{k}_{TC} + \lceil (p_i - 1000) * K_{TC}/N_{ap}^{SRS} \rceil) \bmod K_{TC};$$

in a case that $n_{SRS}^{cs} \notin \{n_{SRS}^{cs,max}/2, \ldots, n_{SRS}^{cs,max} - 1\}$, $$n_{SRS}^{cs,i} = \left[n_{SRS}^{cs} + \frac{n_{SRS}^{cs,max} \cdot [(p_i - 1000) \bmod 2] \cdot 2}{N_{ap}^{SRS}} \right] \bmod n_{SRS}^{cs,max},$$

$$k_{TC}^{(p_i)} = \begin{cases} (\overline{k}_{TC} + K_{TC}/2) \bmod K_{TC} & \text{if } p_i = \{1000, 1001\} (\text{or } p_i \in \{1002, 1003\}) \\ \overline{k}_{TC} & \text{otherwise} \end{cases};$$

or $$n_{SRS}^{cs,i} = \left[n_{SRS}^{cs} + \frac{n_{SRS}^{cs,max} \cdot \lfloor (p_i - 1000) \bmod 2 \rfloor \cdot 2}{N_{ap}^{SRS}} \right] \bmod n_{SRS}^{cs,max},$$

$$k_{TC}^{(p_i)} = \begin{cases} (\overline{k}_{TC} + K_{TC}/2) \bmod K_{TC} & \text{if } p_i = \{1001, 1003\} (\text{or } p_i \in \{1000, 1002\}) \\ \overline{k}_{TC} & \text{otherwise} \end{cases};$$

where $n_{SRS}^{cs,i}$ is the cyclic shift of the sequence to which the antenna port i is mapped, $n_{SRS}^{cs}$ represents the cyclic shift offset value, $N_{ap}^{SRS}$ represents the number of the antenna ports, $n_{SRS}^{cs,max}$ represents the maximum cyclic shift number, $p_i$ represents the index of the antenna port i, $k_{TC}^{(p_i)}$ is the comb position where the antenna port i is mapped, $\overline{k}_{TC}$ represents the comb offset value, and $K_{TC}$ is the comb size of the SRS.

Optionally, in a case that the four antenna ports of the SRS are distinguished by at least one of the cyclic shift of the sequence distinguished or the FDM, where $n_{SRS}^{cs,i}$ is the cyclic shift of the sequence to which the antenna port i is mapped, $n_{SRS}^{cs}$ represents the cyclic shift offset value, $N_{ap}^{SRS}$ represents the number of the antenna ports, $n_{SRS}^{cs,max}$ represents the maximum cyclic shift number, $p_i$ represents the index of the antenna port i, $k_{TC}^{(p_i)}$ is the comb position where the antenna port i is mapped, $\overline{k}_{TC}$ represents the comb offset value, and $K_{TC}$ is the comb size of the SRS.

Optionally, in a case that the number of the antenna ports is 2 and an FDM mode is unrelated to the cyclic shift offset value.

The two antenna ports of the SRS are distinguished by at least one of the cyclic shift of the sequence or the FDM.

Optionally, $$n_{SRS}^{cs,i} = \left[n_{SRS}^{cs} + \frac{n_{SRS}^{cs,max} \cdot (p_i - 1000)}{N_{ap}^{SRS}} \right] \bmod n_{SRS}^{cs,max},$$

$$k_{TC}^{(p_i)} = \begin{cases} (\overline{k}_{TC} + K_{TC}/2) \bmod K_{TC} & \text{if } p_i = 1000 \text{ (or 1001)} \\ \overline{k}_{TC} & \text{otherwise} \end{cases};$$

where $n_{SRS}^{cs,i}$ is the cyclic shift of the sequence to which the antenna port i is mapped, $n_{SRS}^{cs}$ represents the cyclic shift offset value, $N_{ap}^{SRS}$ represents the number of the antenna ports, $n_{SRS}^{cs,max}$ represents the maximum cyclic shift number, $p_i$ represents the index of the antenna port i, $k_{TC}^{(p_i)}$ is the comb position where the antenna port i is mapped, $\overline{k}_{TC}$ represents the comb offset value, and $K_{TC}$ is the comb size of the SRS.

Optionally, in a case that the number of the antenna ports is 2 and an FDM mode is related to the cyclic shift offset value, if $n_{SRS}^{cs} \in \{n_{SRS}^{cs,max}/2, \ldots, n_{SRS}^{cs,max}-1\}$, the two antenna ports of the SRS are distinguished by at least one of the cyclic shift of the sequence or the FDM; or if $n_{SRS}^{cs} \notin \{n_{SRS}^{cs,max}/2, \ldots, n_{SRS}^{cs,max}-1\}$, the two antenna ports of the SRS are distinguished by the cyclic shift of the sequence.

Optionally, $$n_{SRS}^{cs,i} = \left[n_{SRS}^{cs} + \frac{n_{SRS}^{cs,max} \cdot (p_i - 1000)}{N_{ap}^{SRS}}\right] \bmod n_{SRS}^{cs,max},$$

$$k_{TC}^{(p_i)} = \begin{cases} (\bar{k}_{TC} + K_{TC}/2) \bmod K_{TC} & \text{if } p_i = 1000 \text{ (or 1001) and } n_{SRS}^{cs} \in \{n_{SRS}^{cs,max}/2, \ldots, n_{SRS}^{cs,max}-1\} \\ \bar{k}_{TC} & \text{otherwise} \end{cases};$$

where $n_{SRS}^{cs,i}$ is the cyclic shift of the sequence to which the antenna port i is mapped, $n_{SRS}^{cs}$ represents the cyclic shift offset value, $N_{ap}^{SRS}$ represents the number of the antenna ports, $n_{SRS}^{cs,max}$ represents the maximum cyclic shift number, $p_i$ represents the index of the antenna port i, $k_{TC}^{(p_i)}$ is the comb position where the antenna port i is mapped, $\bar{k}_{TC}$ represents the comb offset value, and $K_{TC}$ is the comb size of the SRS.

Optionally, in a case that the number of the antenna ports is 4 and an FDM mode is unrelated to the cyclic shift offset value, $$k_{TC}^{(p_i)} = (\bar{k}_{TC} + (p_i - 1000) * K_{TC}/N_{ap}^{SRS}) \bmod K_{TC},$$

or $$k_{TC}^{(p_i)} = (\bar{k}_{TC} + \lfloor (p_i - 1000) * K_{TC}/N_{ap}^{SRS} \rfloor) \bmod K_{TC},$$

or $$k_{TC}^{(p_i)} = (\bar{k}_{TC} + \lceil (p_i - 1000) * K_{TC}/N_{ap}^{SRS} \rceil) \bmod K_{TC};$$

where $k_{TC}^{(p_i)}$ is the comb position where the antenna port i is mapped, $\bar{k}_{TC}$ represents the comb offset value, $p_i$ represents the index of the antenna port i, $K_{TC}$ is the comb size of the SRS, and $N_{ap}^{SRS}$ represents the number of the antenna ports.

Optionally, in a case that the number of the antenna ports is 2 and an FDM mode is unrelated to the cyclic shift offset value, $$k_{TC}^{(p_i)} = \begin{cases} (\bar{k}_{TC} + K_{TC}/2) \bmod K_{TC} & \text{if } p_i = 1000 \text{ (or 1001)} \\ \bar{k}_{TC} & \text{otherwise} \end{cases};$$

where $k_{TC}^{(p_i)}$ is the comb position where the antenna port i is mapped, $\bar{k}_{TC}$ represents the comb offset value, $p_i$ represents the index of the antenna port i, $K_{TC}$ is the comb size of the SRS, and $N_{ap}^{SRS}$ represents the number of the antenna ports.

Optionally, in a case that the number of the antenna ports is 4, the cyclic shift of the sequence is calculated by the following formula:

$$n_{SRS}^{cs,i} = \left[n_{SRS}^{cs} + \left\lfloor\frac{n_{SRS}^{cs,max} \cdot (p_i - 1000)}{N_{ap}^{SRS}}\right\rfloor\right] \bmod n_{SRS}^{cs,max};$$

or $$n_{SRS}^{cs,i} = \left[n_{SRS}^{cs} + \left\lceil\frac{n_{SRS}^{cs,max} \cdot (p_i - 1000)}{N_{ap}^{SRS}}\right\rceil\right] \bmod n_{SRS}^{cs,max};$$

the comb position is calculated by the following formula:

$$k_{TC}^{(p_i)} = \bar{k}_{TC};$$

in a case that the number of the antenna ports is 2, $$n_{SRS}^{cs,i} = \left[n_{SRS}^{cs} + \frac{n_{SRS}^{cs,max} \cdot (p_i - 1000)}{N_{ap}^{SRS}}\right] \bmod n_{SRS}^{cs,max},$$

$$k_{TC}^{(p_i)} = \bar{k}_{TC};$$

where $n_{SRS}^{cs,i}$ is the cyclic shift of the sequence to which the antenna port i is mapped, $n_{SRS}^{cs}$ represents the cyclic shift offset value, $N_{ap}^{SRS}$ represents the number of the antenna ports, $n_{SRS}^{cs,max}$ represents the maximum cyclic shift number, $p_i$ represents the index of the antenna port i, $k_{TC}^{(p_i)}$ is the comb position where the antenna port i is mapped, $\bar{k}_{TC}$ represents the comb offset value.

Optionally, the comb offset value during mapping of the antenna port i is the lowest resource element (RE) position in one RB of one OFDM symbol where the SRS is located in a case that the number of the antenna port is configured to 1, wherein the antenna port i is any antenna of the SRS; or the comb offset value is configured by network side.

Optionally, the SRS is an SRS for positioning.

Optionally, the number of the antenna ports of the SRS is limited to 1 or 2.

Optionally, at least one of the comb size, the number of the antenna ports or a mode for determining the mapping is agreed by a protocol or indicated by a network.

The terminal can improve the coverage effect and the audibility of the SRS.

It should be understood that, in this embodiment of the present disclosure, the radio frequency unit 401 may be configured to receive and transmit information or a signal in a call process. For example, after receiving downlink data from a base station, the radio frequency unit 401 transmits the downlink data to the processor 410 for processing. In addition, the radio frequency unit 401 transmits uplink data to the base station. Generally, the radio frequency unit 401 includes, but is not limited to, an antenna, at least one amplifier, a transceiver, a coupler, a low noise amplifier, and a duplexer, and the like. In addition, the radio frequency unit 401 may also communicate with a network and other devices through a wireless communication system.

The terminal provides a user with wireless broadband Internet access by using the network module 402, for example, helping the user send and receive E-mail address emails, browse web pages, and access streaming media.

The audio output unit 403 may convert audio data received through the radio frequency unit 401 or the network module 402 or stored in the memory 409 into an audio signal and output the audio signal as a sound. Moreover, the audio output unit 403 may further provide audio output related to a specific function performed by the terminal 400 (such as a call signal reception sound, a message reception sound, or the like). The audio output unit 403 includes a speaker, a buzzer, a telephone receiver, and the like.

The input unit 404 is configured to receive audio or video signals. The input unit 404 may include a graphics processing unit (GPU) 4041 and a microphone 4042. The graphics processing unit 4041 is configured to process image data of a static picture or a video obtained by an image capture device (for example, a camera) in a video capture mode or an image capture mode. A processed image frame may be displayed on the display unit 406. The image frame processed by the graphics processing unit 4041 may be stored in the memory 409 (or another storage medium) or transmitted via the radio frequency unit 401 or the network module 402. The microphone 4042 may receive a sound and may process such a sound into audio data. The processed audio data may be converted, in a call mode, into a format that may be transmitted to a mobile communication base station by using the radio frequency unit 401 for output.

The terminal 400 further includes at least one sensor 405, such as a light sensor, a motion sensor and another sensor. For example, the light sensor includes an ambient light sensor and a proximity sensor. The ambient light sensor can adjust a brightness of a display panel 4061 based on a brightness of ambient light. The proximity sensor can close the display panel 4061 and/or backlight when the terminal 400 moves to an ear. As a type of the motion sensor, an accelerometer sensor may detect an acceleration value in each direction (generally, three axes), and detect a value and a direction of gravity when the accelerometer sensor is static, and may be configured to recognize a mobile terminal posture (such as screen switching between landscape and portrait modes, a related game, or magnetometer posture calibration), a function related to vibration recognition (such as a pedometer or a knock), and the like. The sensor 405 may further include a fingerprint sensor, a pressure sensor, an iris sensor, a molecular sensor, a gyroscope, a barometer, a hygrometer, a thermometer, an infrared sensor, and the like. Details are not described herein.

The display unit 406 is configured to display information input by a user or information provided to a user. The display unit 406 may include a display panel 4061, and the display panel 4061 may be configured in a form of liquid crystal display (LCD), organic light-emitting diode (OLED), or the like.

A user input unit 407 may be configured to receive input digital or character information, and generate key signal input related to user setting and function control of a terminal. For example, the user input unit 407 includes a touch panel 4071 and other input devices 4072. The touch panel 4071, also called a touch screen, may collect touch operation on or near the touch panel by users (for example, operation on the touch panel 4071 or near the touch panel 4071 by fingers or any suitable objects or accessories such as a touch pen by the users). The touch panel 4071 may include two parts: a touch detection device and a touch controller. The touch detection device detects a touch position of a user, detects a signal brought by a touch operation, and transmits the signal to the touch controller. The touch controller receives touch information from the touch detection device, converts the touch information into contact coordinates, sends the contact coordinates to the processor 410, and receives and executes a command from the processor 410. In addition, the touch panel 4071 may be implemented by various types such as a resistive type, a capacitive type, an infrared ray type or a surface acoustic wave type. In addition to the touch panel 4071, the user input unit 407 may further include other input devices 4072. The other input devices 4072 may include but are not limited to: a physical keyboard, a function key (such as a volume control key, a switch key), a trackball, a mouse, and a joystick, which is no longer repeated here.

Optionally, the touch panel 4071 may cover the display panel 4061. When detecting the touch operation on or near the touch panel 4071, the touch panel 4071 transmits the touch operation to the processor 410 to determine a type of a touch event, and then the processor 410 provides corresponding visual output on the display panel 4061 based on the type of the touch event. Although in FIG. 4, the touch panel 4071 and the display panel 4061 are used as two independent components to implement input and output functions of the terminal, in some embodiments, the touch panel 4071 and the display panel 4061 may be integrated to implement the input and output functions of the mobile terminal. This is not specifically limited herein.

The interface unit 408 is an interface for connecting an external device to the terminal 400. For example, the external device may include a wired or wireless headset jack, an external power supply (or a battery charger) port, a wired or wireless data port, a storage card port, a port for connecting a device having an identification module, an audio input/output (I/O) port, a video I/O port, a headset jack, or the like. The interface unit 408 may be configured to receive input (for example, data information and power) from an external device and transmit the received input to one or more elements within the terminal 400, or may be configured to transmit data between the terminal 400 and the external device.

The memory 409 may be configured to store software programs and various data. The memory 409 may mainly include a program storage area and a data storage area. The program storage area may store an operating system, an application program required by at least one function (for example, an audio playing function and an image playing function), and the like. The data storage area may store data (for example, audio data and an address book) created according to use of the mobile phone. In addition, the memory 409 may include a high-speed random access memory, or may include a nonvolatile memory, for example, at least one disk storage device, a flash memory, or another volatile solid-state storage device.

The processor 410 is a control center of the terminal. The processor 410 uses various interfaces and lines to connect the various parts of the entire terminal, and performs various functions of the terminal and processes data by running or executing software programs and/or modules stored in the memory 409 and invoking data stored in the memory 409, to monitor the terminal as a whole. The processor 410 may include one or more processing units. Optionally, the processor 410 may be integrated with an application processor and a modem processor. The application processor mainly processes an operating system, a user interface, an application program, and the like, and the modem processor mainly processes wireless communication. It may be understood that alternatively, the modem processor may not be integrated into the processor 410.

The terminal 400 may further include the power supply 411 (for example, a battery) configured to supply power to various components. Optionally, the power supply 411 may be logically connected to the processor 410 through a power management system, so as to implement functions such as managing charging, discharging, and power consumption through the power management system.

In addition, the terminal 400 includes some function modules that are not shown, which are not elaborated herein.

Optionally, the embodiments of the present disclosure further provide a terminal, including a processor 410, a memory 409, and a computer program stored in the memory 409 and executable on the processor 410. When the computer program is executed by the processor 410, the processes of the embodiment of the method for determining the mapping of the antenna ports are implemented and a same technical effect can be achieved. To avoid repetition, details are not described herein again.

The embodiments of the present disclosure further provide a non-transitory computer-readable storage medium. A computer program is stored in the non-transitory computer-readable storage medium. When being executed by a processor, the method for determining the mapping of the antenna ports provided in the embodiments of the present disclosure can be implemented, and a same technical effect can be achieved. To avoid repetition, details are not described herein. The non-transitory computer-readable storage medium is a read-only memory (ROM), a random access memory (RAM), a magnetic disk, an optical disc, or the like.

It should be noted that in this specification, the terms "comprise", "include", and any other variants thereof are intended to cover non-exclusive inclusion, so that a process, a method, an article, or an device that includes a series of elements not only includes these very elements, but also includes other elements not expressly listed, or also includes elements inherent to this process, method, article, or device. Without being subject to further limitations, an element defined by a phrase "including a . . . " does not exclude presence of other identical elements in the process, method, article, or device that includes the very element.

Based on the foregoing descriptions of the embodiments, a person skilled in the art may clearly understand that the method in the foregoing embodiment may be implemented by software in addition to a necessary universal hardware platform or by hardware only. In most circumstances, the former is a preferred implementation manner. Based on such an understanding, the technical solutions of the present disclosure essentially or the part contributing to the prior art may be implemented in a form of a software product. The computer software product is stored in a storage medium (such as a ROM/RAM, a hard disk, or an optical disc), and includes several instructions for instructing a terminal (which may be mobile phone, a computer, a server, an air conditioner, a network device, or the like) to perform the methods described in the embodiments of the present disclosure.

A person of ordinary skill in the art may be aware that, in combination with the examples described in the embodiments disclosed in this specification, units and algorithm steps may be implemented by using electronic hardware or a combination of computer software and electronic hardware. Whether these functions are performed by using hardware or software depends on a specific application and design constraints of the technical solution. A person skilled in the art may use different methods to achieve the described functions for each particular application, but it should not be considered that the implementation goes beyond the scope of the present disclosure.

It may be clearly understood by a person skilled in the art that, for the purpose of convenient and brief description, for a detailed operating process of the foregoing system, device, and unit, refer to a corresponding process in the foregoing method embodiments. Details are not described herein again.

In the embodiments provided in the present application, it should be understood that the disclosed device and method may be implemented in other manners. For example, the device embodiment described above is only an example. For example, division into the units is only logical function division. There may be other division manners in actual implementation, for example, a plurality of units or components may be combined or integrated into another system, or some features may be ignored or not implemented. In addition, the displayed or discussed mutual couplings or direct couplings or communication connections may be implemented by using some interfaces. The indirect couplings or communication connections between the devices or units may be implemented in electronic, mechanical, or other forms.

The units described as separate parts may or may not be physically separate, and parts displayed as units may or may not be physical units, may be located in one location, or may be distributed on a plurality of network units. Some or all of the units may be selected based on actual requirements to achieve the objectives of the solutions of the embodiments.

In addition, function units in the embodiments of the present disclosure may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of the present disclosure essentially, or the part contributing to the related art may be implemented in a form of a software product. The software product is stored in a storage medium, and includes several instructions for instructing a computer device (which may be a personal computer, a server, or a network device) to perform all or some of the steps of the methods described in the embodiments of the present disclosure. The foregoing storage medium includes: any medium that can store program code, such as a USB flash drive, a removable hard disk, a ROM, a RAM, a magnetic disk, or an optical disc.

A person of ordinary skill in the art can understand that all or some of the procedures in the methods of the foregoing embodiments may be implemented by a computer program controlling related hardware. The program may be stored in a computer-readable storage medium. When the program is executed, the procedures of the embodiments of the foregoing methods may be performed. The foregoing storage medium may be a magnetic disk, an optical disc, a read-only memory (ROM), a random access memory (RAM), or the like.

It may be understood that the embodiments described in the embodiments of the present disclosure may be implemented by hardware, software, firmware, middleware, microcode, or a combination thereof. For implementation with hardware, modules, units, and subunits may be implemented in one or more application specific integrated circuits (ASIC), a digital signal processor (DSP), a digital signal processing device (DSPD), a programmable logic device (PLD), a field-programmable gate array (FPGA), a general-purpose processor, a controller, a microcontroller, a microprocessor, another electronic unit for implementing the functions of the present disclosure, or a combination thereof.

For implementation with software, technologies described in the embodiments of the present disclosure may be implemented by executing functional modules (for example, a process and a function) in the embodiments of the present disclosure. Software code may be stored in a memory and executed by a processor. The memory may be implemented in the processor or outside the processor.

The embodiments of the present disclosure are described above with reference to the accompanying drawings, but the present disclosure is not limited to the foregoing specific implementations. The foregoing specific implementations are merely exemplary instead of restrictive. Under enlightenment of the present disclosure, a person of ordinary skills in the art may make many forms without departing from the aims of the present disclosure and the protection scope of claims, all of which fall within the protection of the present disclosure.

What is claimed is:

1. A method for determining mapping of antenna ports, wherein the method is applied to a terminal and comprises:
   determining mapping of antenna ports of a sounding reference signal (SRS) according to number of the antenna ports of the SRS, wherein the SRS is an SRS with a comb size of N, N is an even number greater than 4, and number of the antenna ports is 1, 2 or 4; wherein the mapping of the antenna ports of the SRS comprises at least one of:
   a cyclic shift of a sequence to which the antenna ports of the SRS are mapped; or
   a comb position where the antenna ports of the SRS are mapped; wherein
   the cyclic shift of the sequence is determined according to at least one of a cyclic shift offset value, a maximum cyclic shift number or an antenna port index; and/or
   the comb position is determined according to at least one of whether frequency division multiplexing (FDM) is performed, a comb offset value, a maximum cyclic shift number, an antenna port index or a comb size of the SRS.

2. The method according to claim 1, wherein in a case that the number of the antenna ports is 4 and an FDM mode is unrelated to the cyclic shift offset value,
   four antenna ports of the SRS are divided into two groups, the antenna ports in a same group are mapped to a same comb position, the antenna ports in a same group are mapped to different sequences of the cyclic shift, and the antenna ports in different groups are mapped to different comb positions; or
   four antenna ports of the SRS are distinguished by at least one of the cyclic shift of the sequence or the FDM.

3. The method according to claim 2, wherein in a case that the four antenna ports of the SRS are divided into two groups, $$n_{SRS}^{cs,i} = \left[n_{SRS}^{cs} + \frac{n_{SRS}^{cs,max} \cdot [(p_i - 1000) \bmod 2] \cdot 2}{N_{ap}^{SRS}}\right] \bmod n_{SRS}^{cs,max},$$

$$k_{TC}^{(p_i)} = \begin{cases} (\bar{k}_{TC} + K_{TC}/2) \bmod K_{TC} & \text{if } p_i = \{1000, 1001\} (\text{or } p_i \in \{1002, 1003\}) \\ \bar{k}_{TC} & \text{otherwise} \end{cases};$$

or $$n_{SRS}^{cs,i} = \left[n_{SRS}^{cs} + \frac{n_{SRS}^{cs,max} \cdot \lfloor(p_i - 1000) \bmod 2\rfloor \cdot 2}{N_{ap}^{SRS}}\right] \bmod n_{SRS}^{cs,max},$$

$$k_{TC}^{(p_i)} = \begin{cases} (\bar{k}_{TC} + K_{TC}/2) \bmod K_{TC} & \text{if } p_i = \{1001, 1003\} (\text{or } p_i \in \{1000, 1002\}) \\ \bar{k}_{TC} & \text{otherwise} \end{cases};$$

wherein $n_{SRS}^{cs,i}$ is the cyclic shift of the sequence to which the antenna port i is mapped, $n_{SRS}^{cs}$ represents the cyclic shift offset value, $N_{ap}^{SRS}$ represents the number of the antenna ports, $n_{SRS}^{cs,max}$ represents the maximum cyclic shift number, $p_i$ represents the index of the antenna port i, $k_{TC}^{(p_i)}$ is the comb position where the antenna port i is mapped, $\bar{k}_{TC}$ represents the comb offset value, and $K_{TC}$ is the comb size of the SRS.

4. The method according to claim 2, wherein in a case that the four antenna ports of the SRS are distinguished by at least one of the cyclic shift of the sequence or the FDM, the cyclic shift of the sequence is calculated by following formula:

$$n_{SRS}^{cs,i} = \left[n_{SRS}^{cs} + \left\lfloor\frac{n_{SRS}^{cs,max} \cdot (p_i - 1000)}{N_{ap}^{SRS}}\right\rfloor\right] \bmod n_{SRS}^{cs,max}, \text{ or}$$

$$n_{SRS}^{cs,i} = \left[n_{SRS}^{cs} + \left\lceil\frac{n_{SRS}^{cs,max} \cdot (p_i - 1000)}{N_{ap}^{SRS}}\right\rceil\right] \bmod n_{SRS}^{cs,max};$$

the comb position is calculated by following formula:

$$k_{TC}^{(p_i)} = \begin{cases} (\bar{k}_{TC} + K_{TC}/2) \bmod K_{TC} & \text{if } p_i = \{1001, 1003\} (\text{or } p_i \in \{1000, 1002\}) \\ \bar{k}_{TC} & \text{otherwise} \end{cases},$$

or $$k_{TC}^{(p_i)} = (\bar{k}_{TC} + (p_i - 1000) * K_{TC}/N_{ap}^{SRS}) \bmod K_{TC}, \text{ or}$$

$$k_{TC}^{(p_i)} = (\bar{k}_{TC} + \lfloor(p_i - 1000) * K_{TC}/N_{ap}^{SRS}\rfloor) \bmod K_{TC}, \text{ or}$$

$$k_{TC}^{(p_i)} = (\bar{k}_{TC} + \lceil(p_i - 1000) * K_{TC}/N_{ap}^{SRS}\rceil) \bmod K_{TC},$$

wherein $n_{SRS}^{cs,i}$ is the cyclic shift of the sequence to which the antenna port i is cs,i mapped, $n_{SRS}^{cs}$ represents the cyclic shift offset value, $N_{ap}^{SRS}$ represents the number of the antenna ports, $n_{SRS}^{cs,max}$ represents the maximum cyclic shift number, $p_i$ represents the index of the antenna port i, $k_{TC}^{(p_i)}$ is the comb position where the antenna port i is mapped, $\bar{k}_{TC}$ represents the comb offset value, and $K_{TC}$ is the comb size of the SRS.

5. The method according to claim 1, wherein in a case that the number of the antenna ports is 4 and an FDM mode is related to the cyclic shift offset value, if $n_{SRS}^{cs} \in \{n_{SRS}^{cs,max}/2, \ldots, n_{SRS}^{cs,max}-1\}$, the four antenna ports of the SRS are distinguished by the FDM, $n_{SRS}^{cs}$ represents the cyclic shift offset value, and $n_{SRS}^{cs,max}$ represents the maximum cyclic shift number; or if $n_{SRS}^{cs} \notin \{n_{SRS}^{cs,max}/2, \ldots, n_{SRS}^{cs,max}-1\}$, the four antenna ports of the SRS are distinguished by at least one of the FDM or the cyclic shift of the sequence, $n_{SRS}^{cs}$ represents the cyclic shift offset value, and $n_{SRS}^{cs,max}$ represents the maximum cyclic shift number; or the four antenna ports of the SRS are distinguished by at least one of the cyclic shift of the sequence or the FDM.

6. The method according to claim 5, wherein in a case that $n_{SRS}^{cs} \in \{n_{SRS}^{cs,max}/2, \ldots, n_{SRS}^{cs,max}-1\}$, $$k_{TC}^{(p_i)} = (\bar{k}_{TC} + (p_i - 1000) * K_{TC}/N_{ap}^{SRS}) \bmod K_{TC}, \text{ or}$$

$$k_{TC}^{(p_i)} = (\bar{k}_{TC} + \lfloor(p_i - 1000) * K_{TC}/N_{ap}^{SRS}\rfloor) \bmod K_{TC}, \text{ or}$$

$$k_{TC}^{(p_i)} = (\bar{k}_{TC} + \lceil(p_i - 1000) * K_{TC}/N_{ap}^{SRS}\rceil) \bmod K_{TC};$$

in a case that $n_{SRS}^{cs} \notin \{n_{SRS}^{cs,max}/2, \ldots, n_{SRS}^{cs,max}-1\}$, $$n_{SRS}^{cs,i} = \left[n_{SRS}^{cs} + \frac{n_{SRS}^{cs,max} \cdot [(p_i - 1000) \bmod 2] \cdot 2}{N_{ap}^{SRS}}\right] \bmod n_{SRS}^{cs,max},$$

$$k_{TC}^{(p_i)} = \begin{cases} (\bar{k}_{TC} + K_{TC}/2) \bmod K_{TC} & \text{if } p_i \in \{1000,1001\} (\text{or } p_i \in \{1002,1003\}) \\ \bar{k}_{TC} & \text{otherwise} \end{cases};$$

or $$n_{SRS}^{cs,i} = \left[n_{SRS}^{cs} + \frac{n_{SRS}^{cs,max} \cdot \lfloor(p_i - 1000) \bmod 2\rfloor \cdot 2}{N_{ap}^{SRS}}\right] \bmod n_{SRS}^{cs,max},$$

$$k_{TC}^{(p_i)} = \begin{cases} (\bar{k}_{TC} + K_{TC}/2) \bmod K_{TC} & \text{if } p_i \in \{1001,1003\} \\ & (\text{or } p_i \in \{1000,1002\}) \\ \bar{k}_{TC} & \text{otherwise} \end{cases};$$

wherein $n_{SRS}^{cs,i}$ is the cyclic shift of the sequence to which the antenna port i is mapped, $n_{SRS}^{cs}$ represents the cyclic shift offset value, $N_{ap}^{SRS}$ represents the number of the antenna ports, $n_{SRS}^{cs,max}$ represents the maximum cyclic shift number, $p_i$ represents the index of the antenna port i, $k_{TC}^{(p_i)}$ is the comb position where the antenna port i is mapped, $\bar{k}_{TC}$ represents the comb offset value, and $K_{TC}$ is the comb size of the SRS.

7. The method according to claim 5, wherein in a case that the four antenna ports of the SRS are distinguished by at least one of the cyclic shift of the sequence or the FDM, $$n_{SRS}^{cs,i} = \left[n_{SRS}^{cs} + \left\lfloor\frac{n_{SRS}^{cs,max} \cdot (p_i - 1000)}{N_{ap}^{SRS}}\right\rfloor\right] \bmod n_{SRS}^{cs,max}; \text{ or}$$

-continued $$n_{SRS}^{cs,i} = \left[n_{SRS}^{cs} + \left\lceil\frac{n_{SRS}^{cs,max} \cdot (p_i - 1000)}{N_{ap}^{SRS}}\right\rceil\right] \bmod n_{SRS}^{cs,max},$$

$$k_{TC}^{(p_i)} = \begin{cases} (\bar{k}_{TC} + K_{TC}/2) \bmod K_{TC} & \text{if } n_{SRS}^{cs} \in \{n_{SRS}^{cs,max}/2, \ldots, n_{SRS}^{cs,max} - 1\} \\ & \text{and } N_{up}^{SRS} = 4 \text{ and } p_i \in \{1001,1003\} \\ \bar{k}_{TC} & \text{otherwise} \end{cases};$$

wherein $n_{SRS}^{cs,i}$ is the cyclic shift of the sequence to which the antenna port i is mapped, $n_{SRS}^{cs}$ represents the cyclic shift offset value, $N_{ap}^{SRS}$ represents the number of the antenna ports, $n_{SRS}^{cs,max}$ represents the maximum cyclic shift number, $p_i$ represents the index of the antenna port i, $k_{TC}^{(p_i)}$ is the comb position where the antenna port i is mapped, $\bar{k}_{TC}$ represents the comb offset value, and $K_{TC}$ is the comb size of the SRS.

8. The method according to claim 1, wherein in a case that the number of the antenna ports is 2 and an FDM mode is unrelated to the cyclic shift offset value, the two antenna ports of the SRS are distinguished by at least one of the cyclic shift of the sequence or the FDM.

9. The method according to claim 8, wherein $$n_{SRS}^{cs,i} = \left[n_{SRS}^{cs} + \frac{n_{SRS}^{cs,max} \cdot (p_i - 1000)}{N_{ap}^{SRS}}\right] \bmod n_{SRS}^{cs,max},$$

$$k_{TC}^{(p_i)} = \begin{cases} (\bar{k}_{TC} + K_{TC}/2) \bmod K_{TC} & \text{if } p_i \in 1001 \text{ (or } 1001) \\ \bar{k}_{TC} & \text{otherwise} \end{cases};$$

wherein $n_{SRS}^{cs,i}$ is the cyclic shift of the sequence to which the antenna port i is mapped, $n_{SRS}^{cs}$ represents the cyclic shift offset value, $N_{ap}^{SRS}$ represents the number of the antenna ports, $n_{SRS}^{cs,max}$ represents the maximum cyclic shift number, $p_i$ represents the index of the antenna port i, $k_{TC}^{(p_i)}$ is the comb position where the antenna port i is mapped, $\bar{k}_{TC}$ represents the comb offset value, and $K_{TC}$ is the comb size of the SRS.

10. The method according to claim 1, wherein in a case that the number of the antenna ports is 2 and an FDM mode is related to the cyclic shift offset value, if $n_{SRS}^{cs} \in \{n_{SRS}^{cs,max}/2, \ldots, n_{SRS}^{cs,max}-1\}$, the two antenna ports of the SRS are distinguished by at least one of the cyclic shift of the sequence or the FDM; or if $n_{SRS}^{cs} \notin \{n_{SRS}^{cs,max}/2, \ldots, n_{SRS}^{cs,max}-1\}$, the two antenna ports of the SRS are distinguished by the cyclic shift of the sequence.

11. The method according to claim 10, wherein $$n_{SRS}^{cs,i} = \left[n_{SRS}^{cs} + \frac{n_{SRS}^{cs,max} \cdot (p_i - 1000)}{N_{ap}^{SRS}}\right] \bmod n_{SRS}^{cs,max},$$

$$k_{TC}^{(p_i)} = \begin{cases} (\bar{k}_{TC} + K_{TC}/2)) \bmod K_{TC} & \text{if } p_i = 1000 (\text{or } 1001) \\ & n_{SRS}^{cs} \in \{n_{SRS}^{cs,max}/2, \ldots, n_{SRS}^{cs,max} - 1\}, \\ \bar{k}_{TC} & \text{otherwise} \end{cases}$$

wherein $n_{SRS}^{cs,i}$ is the cyclic shift of the sequence to which the antenna port i is mapped, $n_{SRS}^{cs}$ represents the cyclic shift offset value, $N_{ap}^{SRS}$ represents the number of the antenna ports, $n_{SRS}^{cs,max}$ represents the maximum cyclic shift number, $p_i$ represents the index of the antenna port i, $k_{TC}^{(p_i)}$ is the comb position where the antenna port i is mapped, $\bar{k}_{TC}$ represents the comb offset value, and $K_{TC}$ is the comb size of the SRS.

12. The method according to claim 1, wherein in a case that the number of the antenna ports is 4 and an FDM mode is unrelated to the cyclic shift offset value, $$k_{TC}^{(p_i)} = (\bar{k}_{TC} + (p_i - 1000) * K_{TC}/N_{ap}^{SRS}) \bmod K_{TC}, \text{ or}$$

$$k_{TC}^{(p_i)} = (\bar{k}_{TC} + \lfloor (p_i - 1000) * K_{TC}/N_{ap}^{SRS} \rfloor) \bmod K_{TC}, \text{ or}$$

$$k_{TC}^{(p_i)} = (\bar{k}_{TC} + \lceil (p_i - 1000) * K_{TC}/N_{ap}^{SRS} \rceil) \bmod K_{TC},$$

wherein $k_{TC}^{(p_i)}$ is the comb position of the antenna port i, $\bar{k}_{TC}$ represents the comb offset value, $p_i$ represents the index of the antenna port i, $K_{TC}$ is the comb size of the SRS, and $N_{ap}^{SRS}$ represents the number of the antenna ports.

13. The method according to claim 1, wherein in a case that the number of the antenna ports is 2 and an FDM mode is unrelated to the cyclic shift offset value, $$k_{TC}^{(p_i)} = \begin{cases} (\bar{k}_{TC} + K_{TC}/2) \bmod K_{TC} & \text{if } p_i = 1000 (\text{or } 1001) \\ \bar{k}_{TC} & \text{otherwise} \end{cases},$$

wherein $k_{TC}^{(p_i)}$ is the comb position of the antenna port i, $\bar{k}_{TC}$ represents the comb offset value, $p_i$ represents the index of the antenna port i, $K_{TC}$ is the comb size of the SRS, and $N_{ap}^{SRS}$ represents the number of the antenna ports.

14. The method according to claim 1, wherein in a case that the number of the antenna ports is 4,
the cyclic shift of the sequence is calculated by following formula:

$$n_{SRS}^{cs,i} = \left[ n_{SRS}^{cs} + \left\lfloor \frac{n_{SRS}^{cs,max} \cdot (p_i - 1000)}{N_{ap}^{SRS}} \right\rfloor \right] \bmod n_{SRS}^{cs,max}, \text{ or}$$

$$n_{SRS}^{cs,i} = \left[ n_{SRS}^{cs} + \left\lceil \frac{n_{SRS}^{cs,max} \cdot (p_i - 1000)}{N_{ap}^{SRS}} \right\rceil \right] \bmod n_{SRS}^{cs,max};$$

the comb position is calculated by following formula:

$$k_{TC}^{(p_i)} = \bar{k}_{TC};$$

in a case that the number of the antenna ports is 2, $$n_{SRS}^{cs,i} = \left[ n_{SRS}^{cs} + \frac{n_{SRS}^{cs,max} \cdot (p_i - 1000)}{N_{ap}^{SRS}} \right] \bmod n_{SRS}^{cs,max},$$

$$k_{TC}^{(p_i)} = \bar{k}_{TC},$$

wherein $n_{SRS}^{cs,i}$ is the cyclic shift of the sequence to which the antenna port i is mapped, $n_{SRS}^{cs}$ represents the cyclic shift offset value, $N_{ap}^{SRS}$ represents the number of the antenna ports, $n_{SRS}^{cs,max}$ represents the maximum cyclic shift number, $p_i$ represents the index of the antenna port i, $k_{TC}^{(p_i)}$ is the comb position where the antenna port i is mapped, and $\bar{k}_{TC}$ represents the comb offset value.

15. The method according to claim 1, wherein the comb offset value during mapping of the antenna port i is the lowest resource element (RE) position in a RB of an orthogonal frequency division multiplexing (OFDM) symbol where the SRS is located in a case that the number of the antenna port is configured to 1, the antenna port i is any antenna of the SRS; or
the comb offset value is configured by network side.

16. The method according to claim 1, wherein the SRS is an SRS for positioning.

17. A terminal, comprising: a memory, a processor, and a program stored in the memory and executable on the processor, wherein the program, when executed by the processor, causes the terminal to perform:
determining mapping of antenna ports of a sounding reference signal (SRS) according to number of the antenna ports of the SRS, wherein the SRS is an SRS with a comb size of N, N is an even number greater than 4, and number of the antenna ports is 1, 2 or 4; wherein
the mapping of the antenna ports of the SRS comprises at least one of:
a cyclic shift of a sequence to which the antenna ports of the SRS are mapped; or
a comb position where the antenna ports of the SRS are mapped; wherein the cyclic shift of the sequence is determined according to at least one of a cyclic shift offset value, a maximum cyclic shift number or an antenna port index; and/or
the comb position is determined according to at least one of whether frequency division multiplexing (FDM) is performed, a comb offset value, a maximum cyclic shift number, an antenna port index or a comb size of the SRS.

18. A non-transitory computer-readable storage medium, wherein the non-transitory computer-readable storage medium stores a computer program, and the computer program, when executed by a processor of a terminal, causes the terminal to perform:
determining mapping of antenna ports of a sounding reference signal (SRS) according to number of the antenna ports of the SRS, wherein the SRS is an SRS with a comb size of N, N is an even number greater than 4, and number of the antenna ports is 1, 2 or 4; wherein
the mapping of the antenna ports of the SRS comprises at least one of:
a cyclic shift of a sequence to which the antenna ports of the SRS are mapped; or
a comb position where the antenna ports of the SRS are mapped; wherein
the cyclic shift of the sequence is determined according to at least one of a cyclic shift offset value, a maximum cyclic shift number or an antenna port index; and/or
the comb position is determined according to at least one of whether frequency division multiplexing (FDM) is performed, a comb offset value, a maximum cyclic shift number, an antenna port index or a comb size of the SRS.

19. The terminal according to claim 17, wherein in a case that the number of the antenna ports is 4 and an FDM mode is unrelated to the cyclic shift offset value,
four antenna ports of the SRS are divided into two groups, the antenna ports in a same group are mapped to a same comb position, the antenna ports in a same group are mapped to different sequences of the cyclic shift, and the antenna ports in different groups are mapped to different comb positions; or four antenna ports of the SRS are distinguished by at least one of the cyclic shift of the sequence or the FDM.

20. The terminal according to claim 19, wherein in a case that the four antenna ports of the SRS are divided into two groups, $$n_{SRS}^{cs,i} = \left[ n_{SRS}^{cs} + \frac{n_{SRS}^{cs,max} \cdot [(p_i - 1000) \bmod 2] \cdot 2}{N_{ap}^{SRS}} \right] \bmod n_{SRS}^{cs,max},$$

$$k_{TC}^{(p_i)} = \begin{cases} (\bar{k}_{TC} + K_{TC}/2) \bmod K_{TC} & \text{if } p_i \in \{1000, 1001\} \text{(or } p_i \in \{1002, 1003\}) \\ \bar{k}_{TC} & \text{otherwise} \end{cases};$$

or $$n_{SRS}^{cs,i} = \left[ n_{SRS}^{cs} + \frac{n_{SRS}^{cs,max} \cdot [(p_i - 1000)/2] \cdot 2}{N_{ap}^{SRS}} \right] \bmod n_{SRS}^{cs,max},$$

$$k_{TC}^{(p_i)} = \begin{cases} (\bar{k}_{TC} + K_{TC}/2) \bmod K_{TC} & \text{if } p_i \in \{1001, 1003\} \text{(or } p_i \in \{1000, 1002\}) \\ \bar{k}_{TC} & \text{otherwise} \end{cases};$$

wherein $n_{SRS}^{cs,i}$ is the cyclic shift of the sequence to which the antenna port i is mapped, $n_{SRS}^{cs}$ represents the cyclic shift offset value, $N_{ap}^{SRS}$ represents the number of the antenna ports, $n_{SRS}^{cs,max}$ represents the maximum cyclic shift number, $p_i$ represents the index of the antenna port i, $k_{TC}^{(p_i)}$ is the comb position where the antenna port i is mapped, $\bar{k}_{TC}$ represents the comb offset value, and $K_{TC}$ is the comb size of the SRS.

* * * * *